(12) United States Patent
Gale et al.

(10) Patent No.: US 10,176,729 B2
(45) Date of Patent: Jan. 8, 2019

(54) NAVIGABLE TOPOLOGICAL MAPS

(71) Applicant: HERE Global B.V., Eindhoven (NL)

(72) Inventors: William N. Gale, Oak Park, IL (US);
Joseph P. Mays, Chicago, IL (US);
Frank J. Kozak, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/860,399

(22) Filed: Jan. 2, 2018

(65) Prior Publication Data

US 2018/0122270 A1 May 3, 2018

Related U.S. Application Data

(63) Continuation of application No. 12/802,292, filed on Jun. 3, 2010, now Pat. No. 9,892,660.

(51) Int. Cl.
*G09B 29/10* (2006.01)
*G09B 29/00* (2006.01)
*G09G 5/377* (2006.01)

(52) U.S. Cl.
CPC ......... *G09B 29/106* (2013.01); *G09B 29/007* (2013.01); *G09G 5/377* (2013.01); *G09G 2340/12* (2013.01)

(58) Field of Classification Search
CPC ................ G09B 29/106; G09B 29/007; G09G 2340/12; G09G 5/377
(Continued)

(56) References Cited

U.S. PATENT DOCUMENTS 6,546,224 B2 4/2003 Saito
7,542,882 B2 6/2009 Agrawala et al.
(Continued)

FOREIGN PATENT DOCUMENTS

JP H0553500 A 3/1993
JP 2001041765A A 2/2001
(Continued)

OTHER PUBLICATIONS

Daniel Elroi, "GIS and Schemtaic Maps: A New Symbiotic Relationship", Proc. GIS.LIS'88, 1988, 9 pages, http://www.elroi.com/papers%20GIS%20LIS%2088/GISLIS88.html.
European Office Action for related European Application No. 11 165 577.5-1958 dated Mar. 13, 2017.
(Continued)

*Primary Examiner* — Isaac G Smith
(74) *Attorney, Agent, or Firm* — Lempia Summerfield Katz LLC

(57) ABSTRACT

Disclosed herein are methods of providing location-based information with respect to a topological map. A method may include (a) receiving a query for location-related information, (b) optionally generating data representing the topological map, (c) accessing the location-related information in a map-to-scale, (d) optionally determining an association between one or more points (or links) in the map-to-scale and one or more corresponding points (or links) in a topological map, (e) identifying one or more points (or links) in the map-to-scale that relate to the location-related information and that correspond to one or more points (or links) in the topological map, (f) optionally determining a relative position of the location-related information with respect to the identified one or more map-to-scale points (or links), and (g) displaying the location-related information with respect to the corresponding one or more points (or links) in the topological map.

24 Claims, 16 Drawing Sheets

(58) Field of Classification Search
USPC .......................................... 701/300; 382/113
See application file for complete search history.

(56) References Cited

U.S. PATENT DOCUMENTS

| | | | |
|---|---|---|---|
| 7,634,358 B2 | 12/2009 | Jendbro | |
| 7,649,534 B2 * | 1/2010 | Salmre | G09G 5/00 345/441 |
| 7,711,478 B2 | 5/2010 | Gluck | |
| 7,917,286 B2 | 3/2011 | Taylor et al. | |
| 2006/0287815 A1 | 12/2006 | Gluck | |
| 2008/0059452 A1 | 3/2008 | Frank | |
| 2009/0187334 A1 | 7/2009 | Neukirchner | |
| 2010/0088631 A1 | 4/2010 | Schiller | |
| 2011/0141115 A1 * | 6/2011 | Brandes et al. | G06T 3/00 345/428 |
| 2011/0196610 A1 | 8/2011 | Waldman et al. | |

FOREIGN PATENT DOCUMENTS

| | | |
|---|---|---|
| JP | 2001283236 | 10/2001 |
| JP | 2003177028 | 6/2003 |
| KR | 20020031262 | 5/2002 |
| WO | 2009112190 | 9/2009 |

OTHER PUBLICATIONS

European Patent Office, European Search Report for Appl. No. EP 11 16 5577, Dec. 22, 2014.
Japanese Office Action cited in JP2011-137804, dated Jan. 26, 2015.
Japanese Office action for related Japanese Application No. 2011-137804, dated Nov. 9, 2015, with English Translation.
Japanese Preappeal Review Report for related application No. 2011-137804, dated Apr. 7, 2016 with English Translation.
Silvania Avelar et al., "Modeling a Public Transport Network for Generation of Schematic Maps and Location Queries", Proceedings of the 20th International Crtographic Conference, 2001, vol. 3, Beijing, China.

* cited by examiner

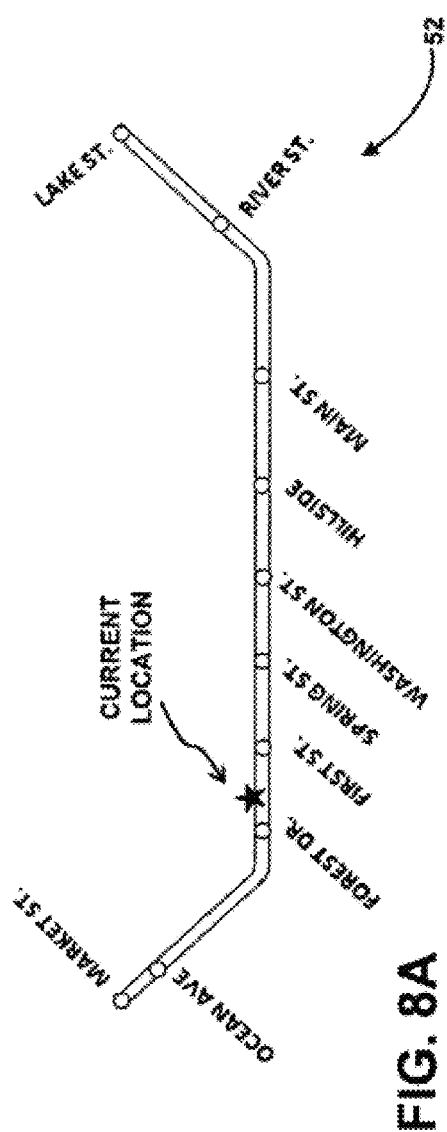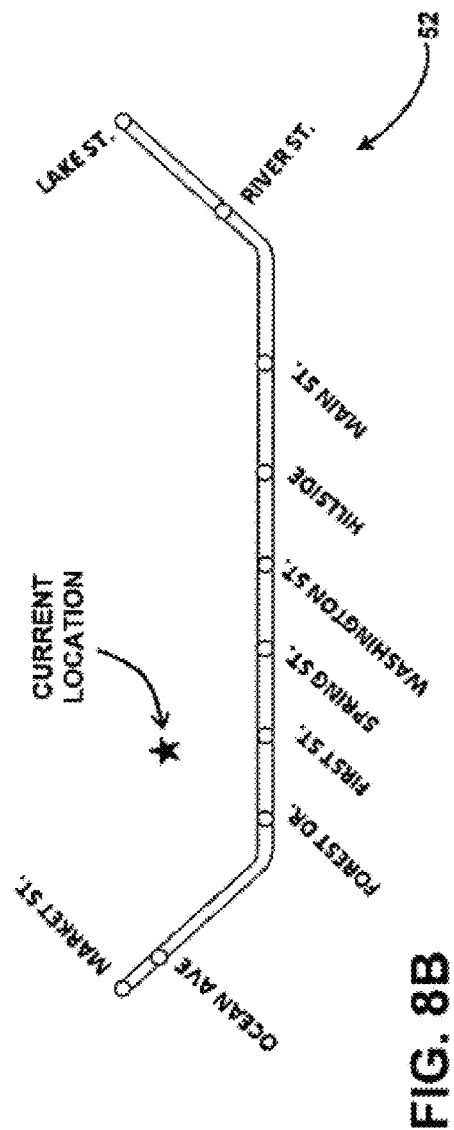
FIG. 8A
FIG. 8B

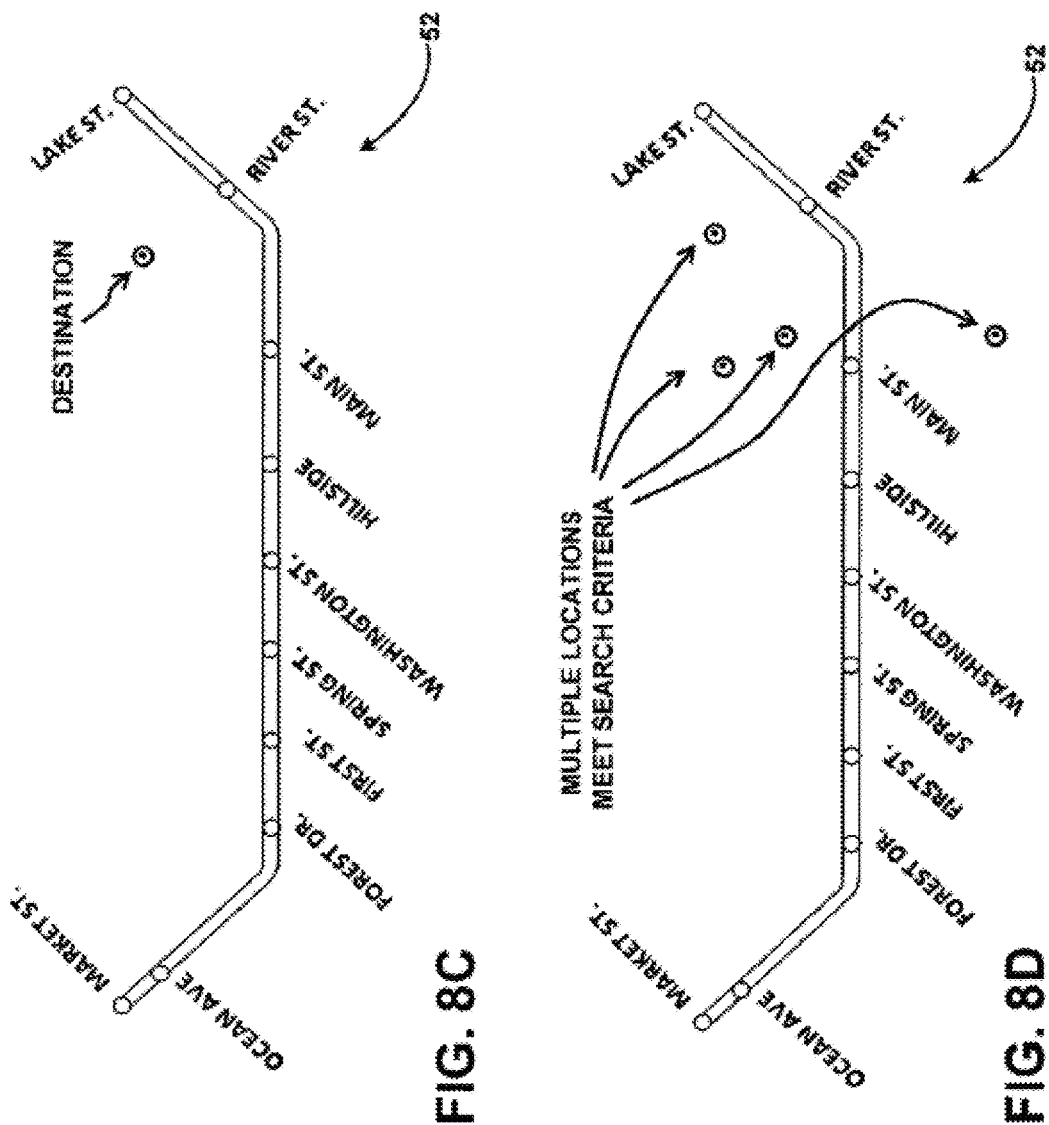

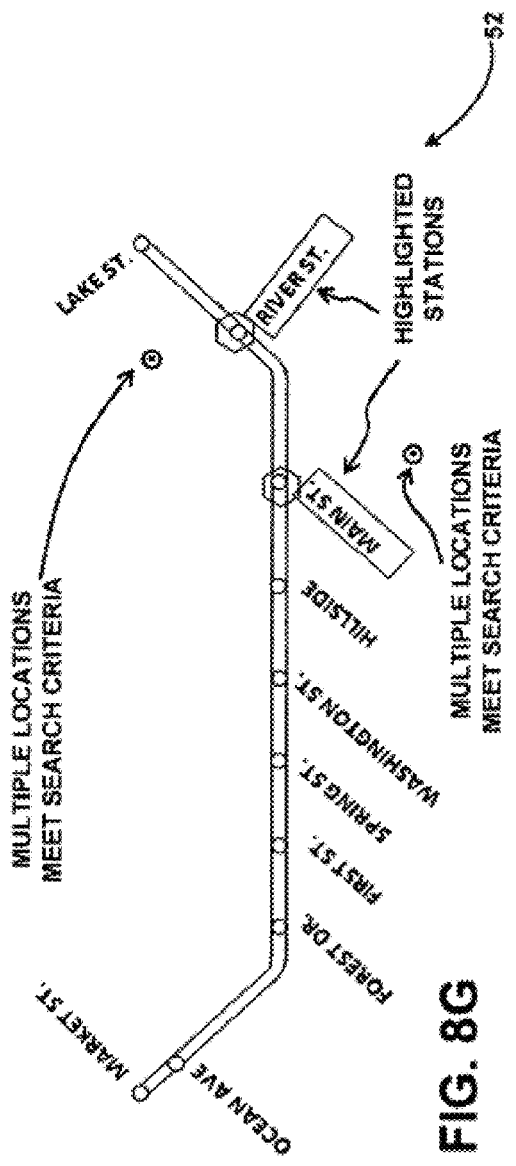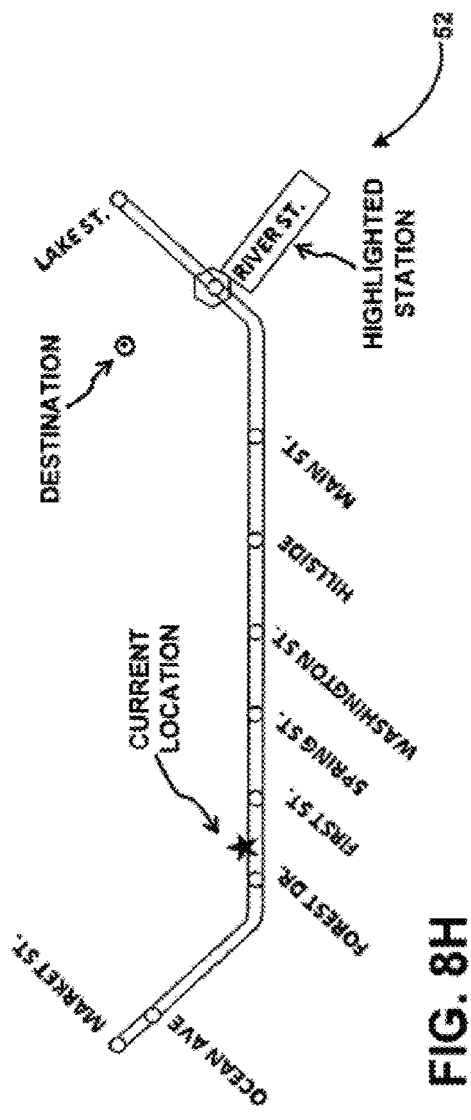
FIG. 8G
FIG. 8H

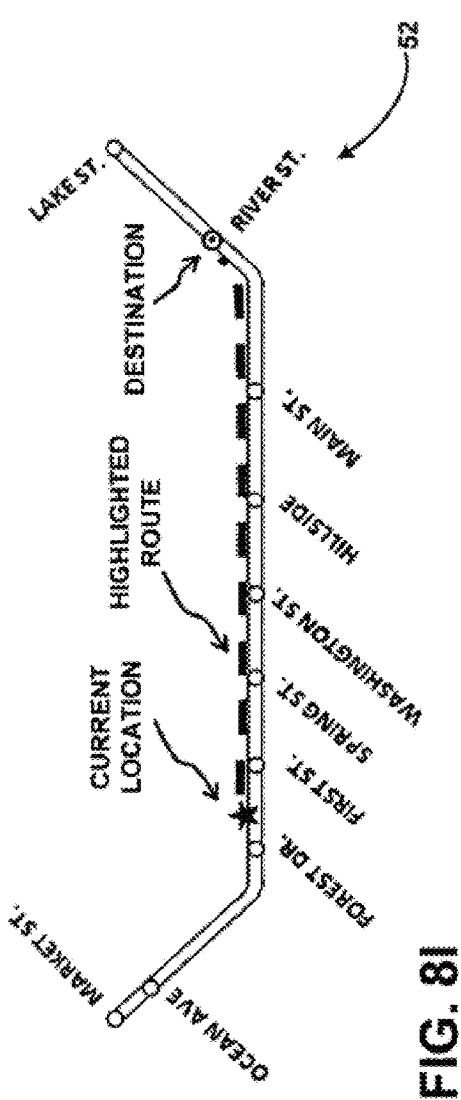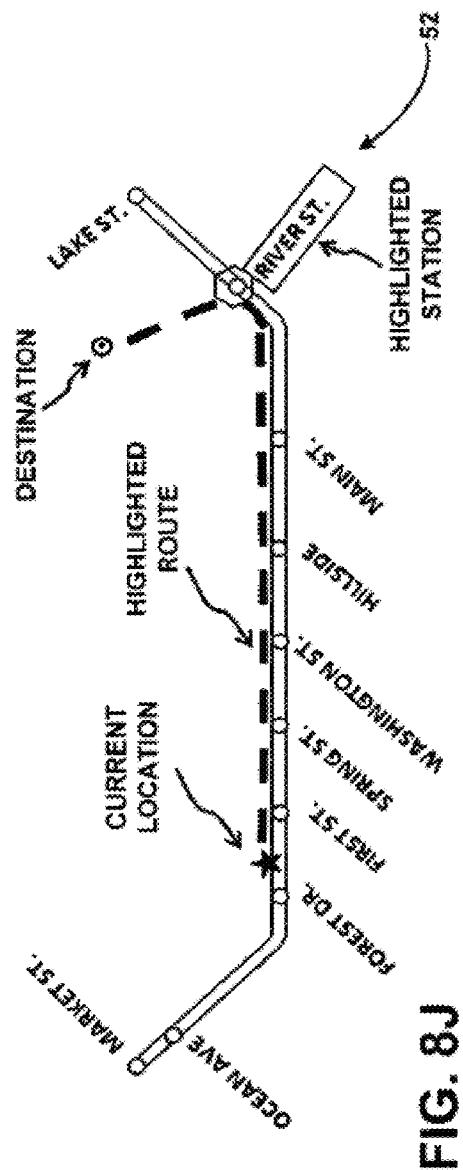

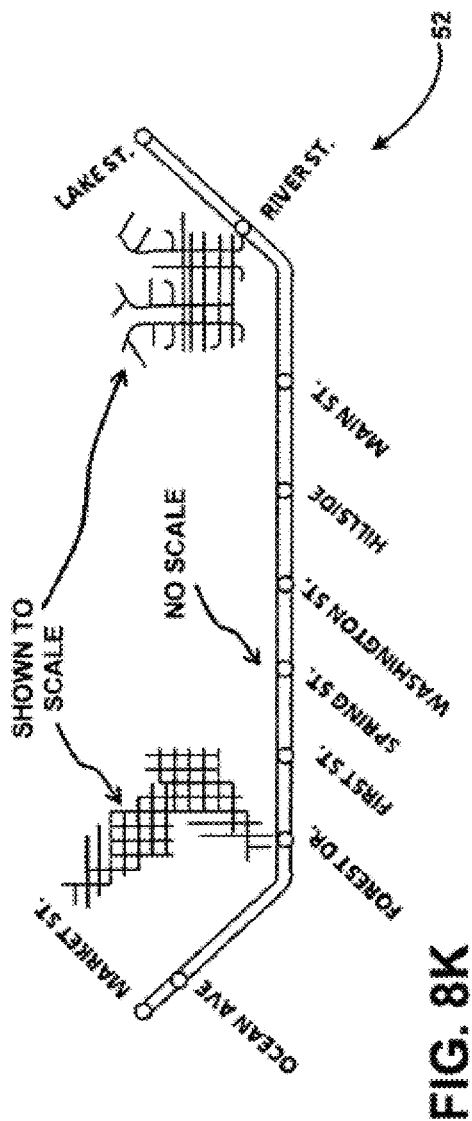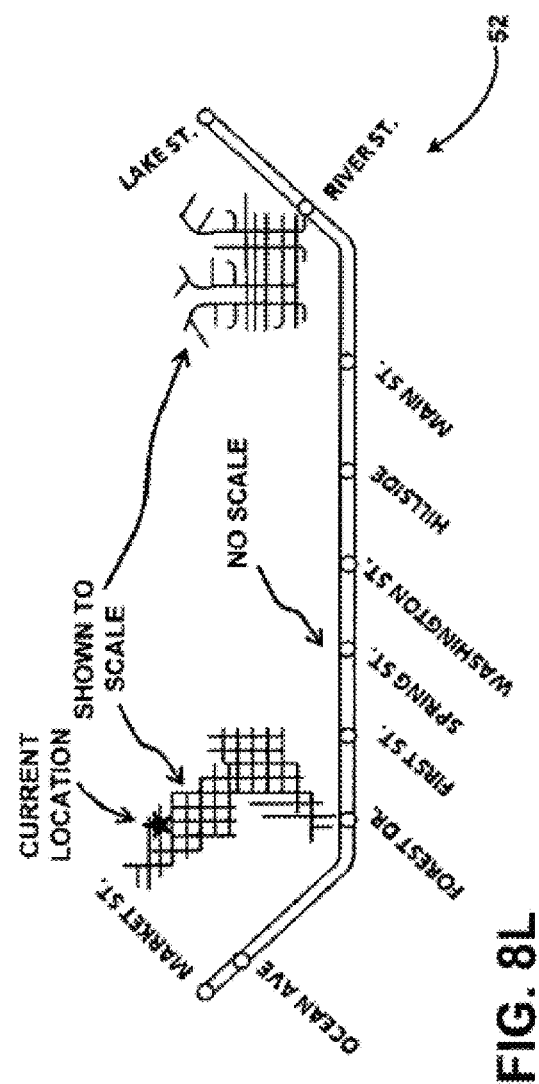

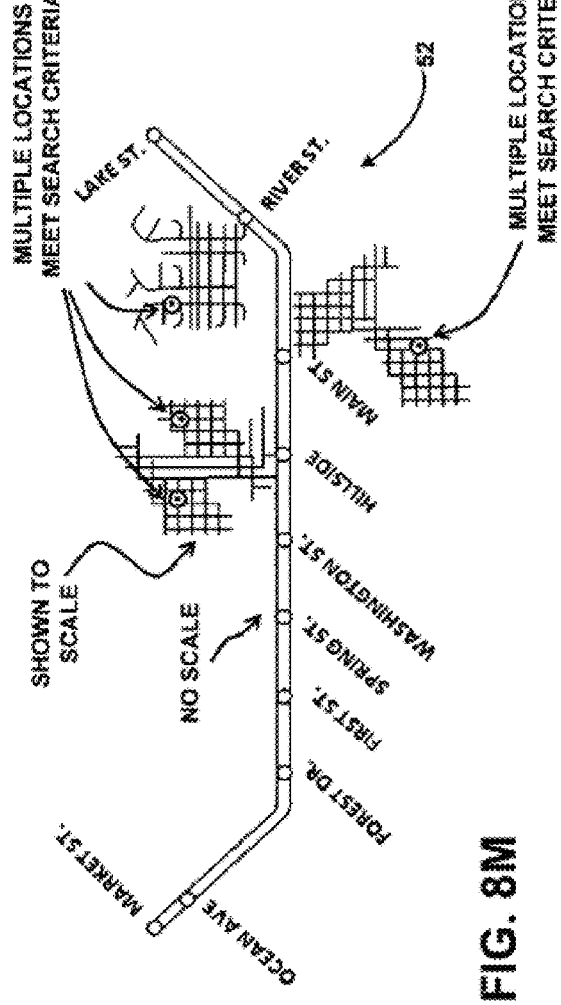
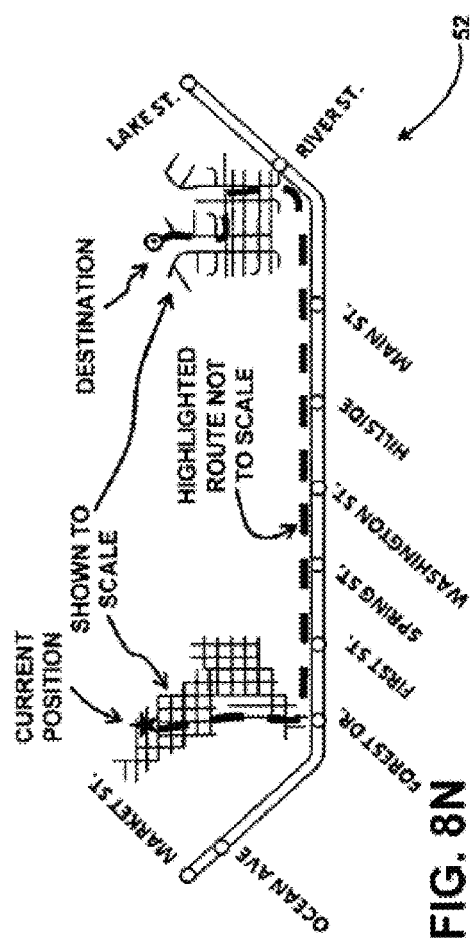
FIG. 8M
FIG. 8N

NAVIGABLE TOPOLOGICAL MAPS

REFERENCE TO RELATED APPLICATIONS

This application is a continuation under 37 C.F.R. § 1.53(b) of U.S. patent application Ser. No. 12/802,292 filed Jun. 3, 2010, now U.S. Pat. No. 9,892,660, the entire disclosure of which is hereby incorporated by reference.

BACKGROUND

Computer-based devices, platforms, or systems are available that provide users with various navigation-related functions and features. Such devices, platforms or systems (referred to collectively herein as "navigation systems") include mobile phones, smart phones, personal navigation devices ("PNDs"), vehicle navigation systems, personal digital devices (PDAs), tablets, etc., and general computing devices, such as personal computers, on which a navigation-related software application is installed. Some navigation systems are able to determine an optimum route to travel along a road and/or a pedestrian pathway from an origin location to a destination location in a region. Using input from a user, and optionally from equipment that can determine the user's location (such as a GPS system), the navigation system can examine various potential routes between the origin and destination locations to determine the optimum route.

The navigation system may then provide the user with information about the optimum route in the form of guidance that identifies the driving and/or walking maneuvers required to be taken by the user to travel from the origin to the destination location. The guidance may take the form of visual and/or audio instructions that are provided along the way as the user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems may use geographic data. The geographic data may be in the form of one or more databases that include data representing physical features in the region. The database includes information about the represented geographic features, such as the positions of the roads, speed limits along portions of roads, address ranges along the road portions, turn restrictions at intersections of roads, direction restrictions, such as one-way streets, and so on. The geographic data may also include information about points of interest, such as restaurants, hotels, airports, gas stations, stadiums, police stations, and so on.

While navigation systems provide useful information to users, there continues to be room for new features and improvements.

OVERVIEW

Disclosed herein are methods of providing location-based information with respect to a topological map. A first method may include (a) receiving into a computing device a query for location-related information, (b) accessing the location-related information in a map-to-scale (e.g., a map database), (c) identifying one or more points in the map-to-scale that relate to the location-related information and that correspond to one or more points in a topological map, and (d) displaying the location-related information with respect to the corresponding one or more points in the topological map. A second method may include (a) receiving into a computing device a query for location-related information, (b) accessing the location-related information in a map-to-scale (e.g., a map database), (c) identifying one or more links in the map-to-scale that relate to the location-related information and that correspond to one or more links in a topological map, and (d) displaying the location-related information with respect to the corresponding one or more links in the topological map.

The methods of providing location-based information with respect to a topological map may also include other features. In one example, in addition to the feature of identifying the one or more points (or links) in the map-to-scale, the method may include a feature of generating data representing the topological map. In another example, in addition to the feature of identifying the one or more points (or links) in the map-to-scale, the method may include a feature of determining an association between one or more points (or links) in the map-to-scale and one or more corresponding points (or links) in the topological map. In yet another example, the method may include a feature of determining a relative position of the location-related information with respect to the identified one or more map-to-scale points (or links). The methods may also include other features.

The location-related information may take various forms. In one example, the location-related information may include a current location of the computing device. In another example, the location-related information may include a destination input by a user. In yet another example, the location-related information may include a location of a point of interest. In a further example, the location-related information may include a route between an origin and a destination. Other examples are possible as well.

The feature of displaying the location-related information with respect to the one or more points (or links) in the topological map may also take various forms. In one example, this feature may include displaying the location-related information in an augmented reality view. In another example, this feature may include displaying an updated topological map that includes the location-related information. In yet another example, this feature may include displaying the location-related information at a relative position on a link in the topological map that is based on a determined relative position of the location-related information on a corresponding link in the map-to-scale.

The map-to-scale and the topological map may also be provided by various sources. In one example, the map-to-scale may be provided by a map developer and the topological map may be provided by a third party. In another example, the map-to-scale and the topological map may both be provided by a map developer. Other examples are possible as well.

Also disclosed herein is a non-transitory computer readable medium having data stored thereon, the data including (a) topological data representing points depicted in a topological map, (b) map-to-scale data representing points depicted in a map-to-scale, and (c) association data indicating an association between points depicted in the topological map and corresponding points depicted in the map-to-scale.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

DETAILED DESCRIPTION

The example embodiments described herein may provide navigation-related functions and features for a topological map, such as display of location-related information with respect to a topological map. The techniques disclosed herein may be applicable to any topological map, including transit maps.

It should be understood that the arrangements described herein are set forth for purposes of example only. As such, those skilled in the art will appreciate that other arrangements and other elements (e.g., components, interfaces, functions, orders of functions, etc.) can be used instead, some elements may be added, and/or some elements may be omitted altogether. Further, those skilled in the art will appreciate that many of the elements described herein are functional elements that may be implemented as discrete or distributed components or in conjunction with other components, and in any suitable combination and location. Still further, various functions described herein as being performed by one or more entities may be carried out by hardware, firmware and/or software. For instance, various functions may be carried out by a processor executing a set of program instructions written in any suitable programming language (e.g., C, C++, Java, etc.) and stored in memory.

I. Map-to-Scale

As stated above, navigation systems use geographic data to provide various navigation-related features and functions. In order to provide these features and functions accurately and reliably, the geographic data itself possesses a high level of accuracy. The kind of geographic data that possesses a high level of accuracy includes that data that represents the positions, sizes, and shapes (i.e., geometry) of geographic features, distances, directions (i.e., heading) of roads, scale, etc. Considerable effort and expense is directed to making the geographic data used by navigation systems accurate and up-to-date.

Figure 1:
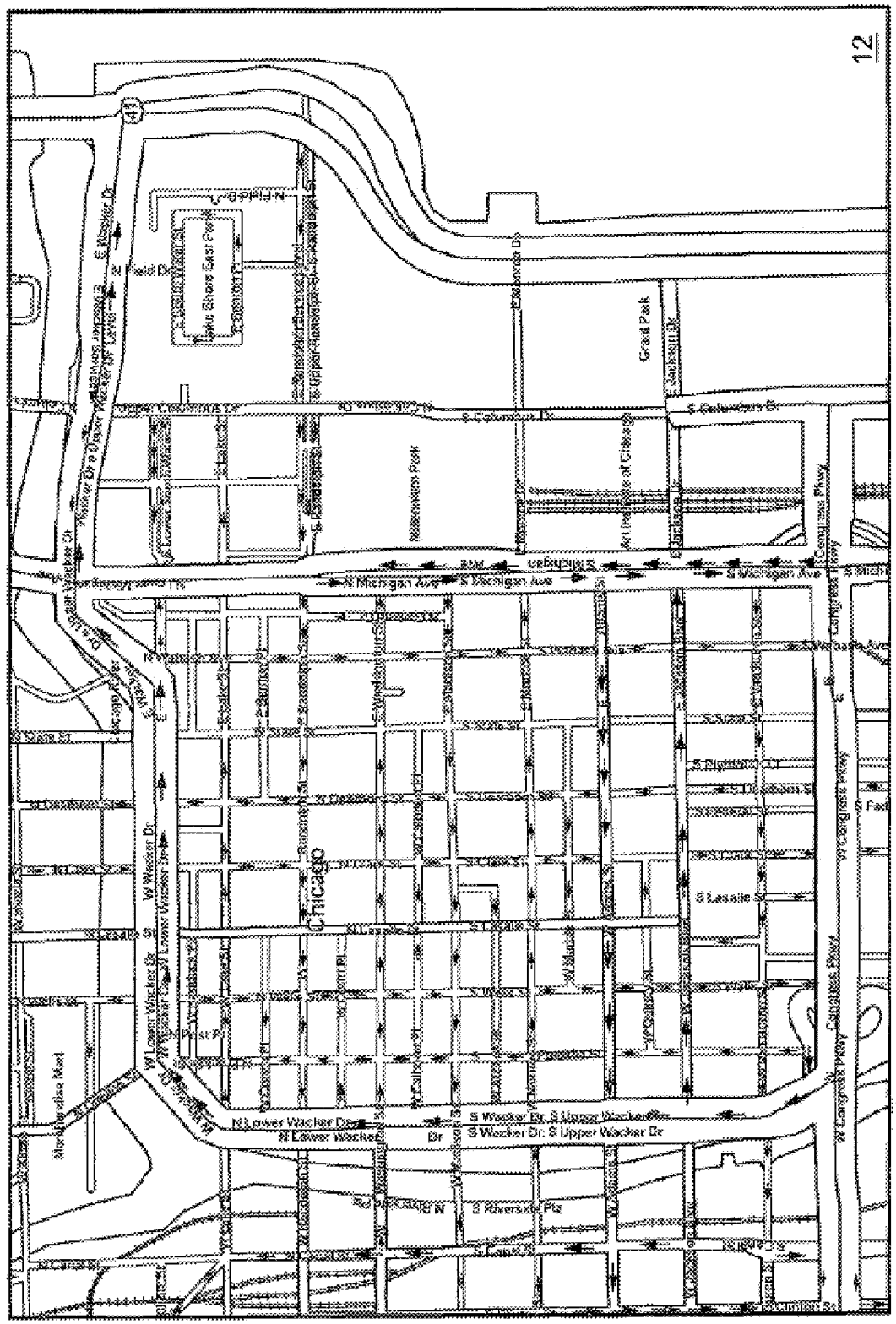
FIG. 1 shows a map-to-scale of a region, according to an example embodiment.

Among the navigation-related features that a navigation system can provide using geographic data is to present a map graphically to the user on a display associated with the navigation system. Because the geographic data used by a navigation system is very accurate, a map rendered by the navigation system on the display can likewise be very accurate and to scale. For purposes of this disclosure, a map-to-scale is a map that depicts a region with geographic accuracy and scaling. In this respect, the map-to-scale may employ a geographic coordinate system, such as World Geodetic System 84 (WGS84), that enables locations to be specified using geographic coordinates (e.g., latitude and longitude). The map-to-scale may depict various physical features in the region, such as a road network, a transit line network (e.g., bus lines, rapid transit lines, commuter rail lines, etc.), POIs (e.g., businesses, facilities, etc.), pedestrian pathways (e.g., sidewalks, bike links, etc.), bodies of water (e.g., oceans, lakes, rivers, etc.), etc. FIG. 1 shows a map-to-scale 10 of a region 12, according to an example embodiment.

To provide users with navigation-related functions and features for a map-to-scale, a map developer collects, verifies, and organizes data that represents physical features in the region into a map database (referred to herein as a "map-to-scale database"). The physical features may include relevant points (e.g., road intersections, highway exits, transit line stops, POIs, etc.) and relevant links between points (e.g., road or transit line segments). A navigation system may then use data from the map-to-scale database along with position data to provide users with navigation-related functions and features.

Figure 2:
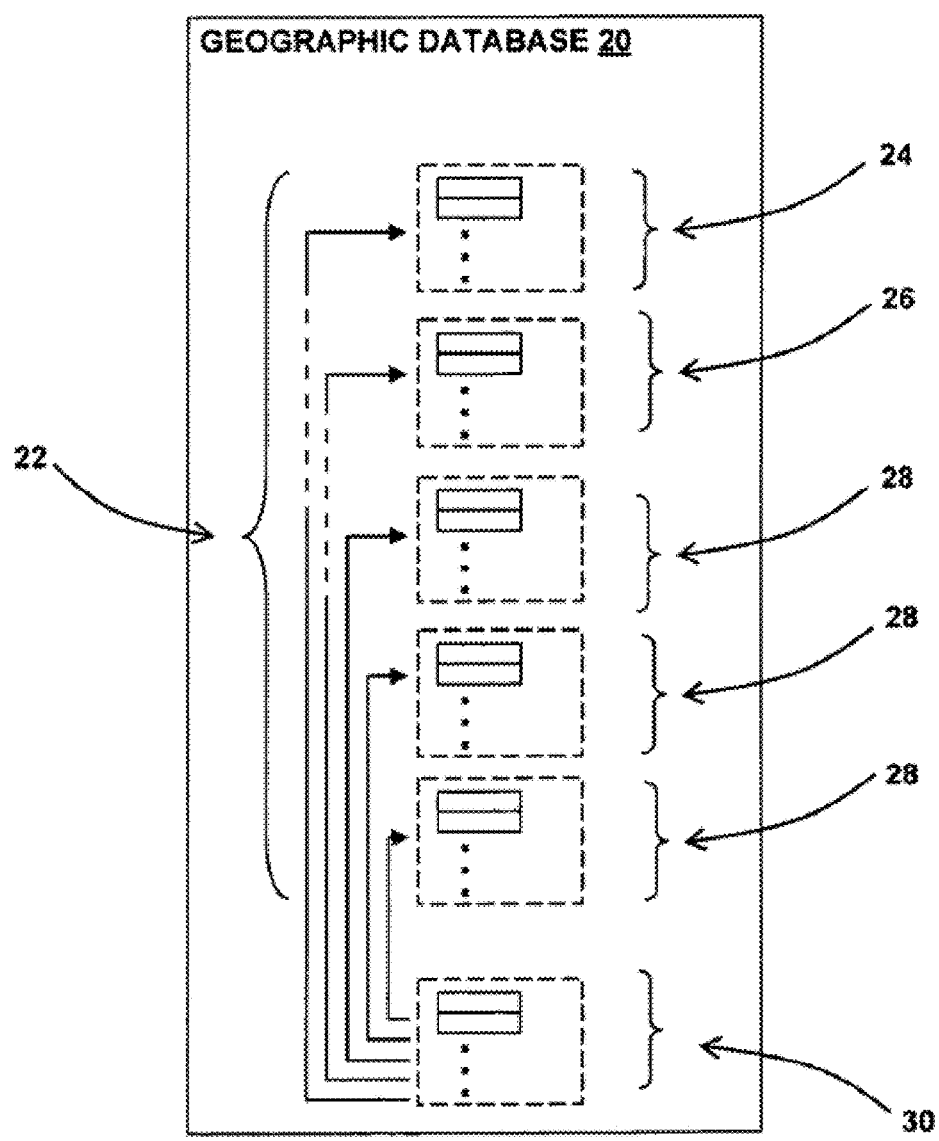
FIG. 2 depicts a block diagram of a map-to-scale database, according to an example embodiment.

FIG. 2 depicts a block diagram of a map-to-scale database 20, according to an example embodiment. The map-to-scale database 20 may be maintained in one or more data storage mediums. As shown, the map-to-scale database 20 may contain data 22 representing physical features in a depicted region with geographic accuracy and scaling.

Figure 3:
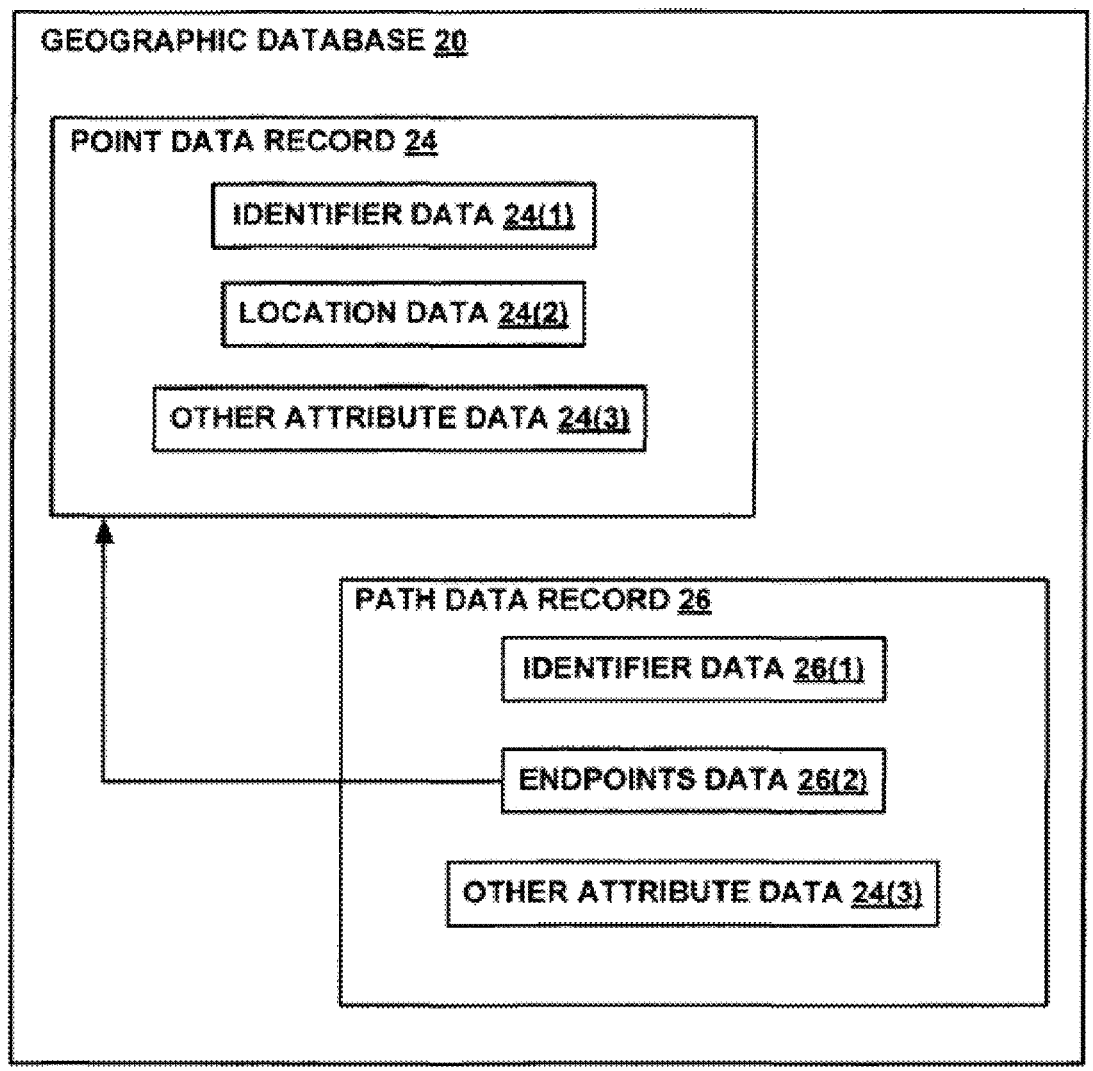
FIG. 3 shows components of a point data record and a link data record contained in the map-to-scale database of FIG. 2, according to an example embodiment.

In one aspect, the data 22 may include at least one point database record 24 (or "entity" or "entry") for each relevant point in the depicted region. FIG. 3 shows components of a point data record 24 contained in the map-to-scale database 20, according to one example embodiment. As shown, the point data record 24 may include or be associated with data 24(1) identifying the represented point (e.g., a point ID, a name associated with the point, etc.) and data 24(2) indicating a geographic location of the represented point (e.g., latitude and longitude). Additionally, the point data record 24 may optionally include or be associated with other attribute data 24(3) for the represented point, which may vary depending on the type of represented point. In one example, the other attribute data 24(3) may include data identifying any link (e.g., road or transit line segments) to which the represented point is connected. In another example, the other attribute data 24(3) may include data about any network (e.g., road or public transportation network) to which the represented point belongs. In yet another example, the other attribute data 24(3) may include data indicating a relative position of the represented point within the topology of a network. Many other examples are possible as well.

In another aspect, the data 22 may include at least one link database record 26 (or "entity" or "entry") for each relevant link in the region. FIG. 3 also shows components of a link data record 26 contained in the map-to-scale database 20, according to one example embodiment. As shown, the link data record 26 may include or be associated with data 26(1) identifying the represented link and data 26(2) identifying endpoints of the represented link (e.g., an identifier of and/or a link to point data records 24 representing the endpoint nodes of the represented link). In this respect, one endpoint of the represented link may be designated as a reference endpoint from which distance and/or time along the represented link can be measured. Additionally, the link data record 26 may optionally include or be associated with other attribute data 26(3) for the represented link, which may vary depending on the type of represented link. In one example, the other attribute data 26(3) may include data indicating a shape of the represented link (e.g., a mathematical function, shape points, polylines, etc.). In another example, the other attribute data 26(3) may include data about any network (e.g., road or public transportation network) to which the represented link belongs. Many other examples are possible as well.

In yet another aspect, the data 22 may include other data records 28 that represent other kinds of physical features or anything else in the depicted region. For example, the other data records 28 may include data representing parks, bodies of water, etc. Many other examples are possible as well.

The map-to-scale database 20 may additionally include indexes 30. The indexes 30 may include various types of indexes that associate different types of data contained in the map-to-scale database 20 to each other or that associate to other aspects of the data contained in the map-to-scale database 20. For example, the indexes 30 may associate point data records 24 with link data records 26. As another example, the indexes 30 may associate point data records 24 with other point data records 24, or link data records 26 with other link data records 26. As still another example, the indexes 30 may associate point data records 24 and/or link data records 26 with other data records 28. Other examples are possible as well.

The data 22 may be organized in the map-to-scale database 20 in various manners. In one example, the data 22 may be organized according to type, such that point data records for a first point type (e.g., road intersections) are maintained separately from point data records for other point types (e.g., transit line stops, POIs, etc.) and link data records for a first link type (e.g. a road segment) are maintained separately from link data records for other link types (e.g., transit line segments). In another example, the data 22 may be organized according to network, such that data records associated with a first network are maintained separately from data records associated with other networks. In still another example, the data 22 may be organized according to location, such that data records associated with a first region are maintained separately from data records associated with other regions. In a further example, the data 22 may be organized according to navigation-related functions, such that data records associated with a first navigation-related function (e.g., routing) are maintained separately from data records associated with other navigation-related functions (e.g., map display). Many other examples are possible as well.

III. Topological Map

A topological map is a simplified map that depicts the topology of certain physical features in a region without geographic accuracy, geometry, distance, direction, or scaling, while omitting other irrelevant features in the region. According to a further definition, a topological map is a graphical depiction of one or more linear paths, wherein travel is restricted to travel just on each path in either one or both directions, access to or from each path is restricted to access points along each path which are encountered in a fixed sequential order, and further wherein the topological map is presented without geographic accuracy or scaling. Topological maps present information in this way in order to convey specific information in an easy to understand way. One example of a topological map is a transit map that depicts the relevant stops of a transit line, such as the Tube map of the London Underground for instance.

Figure 4:
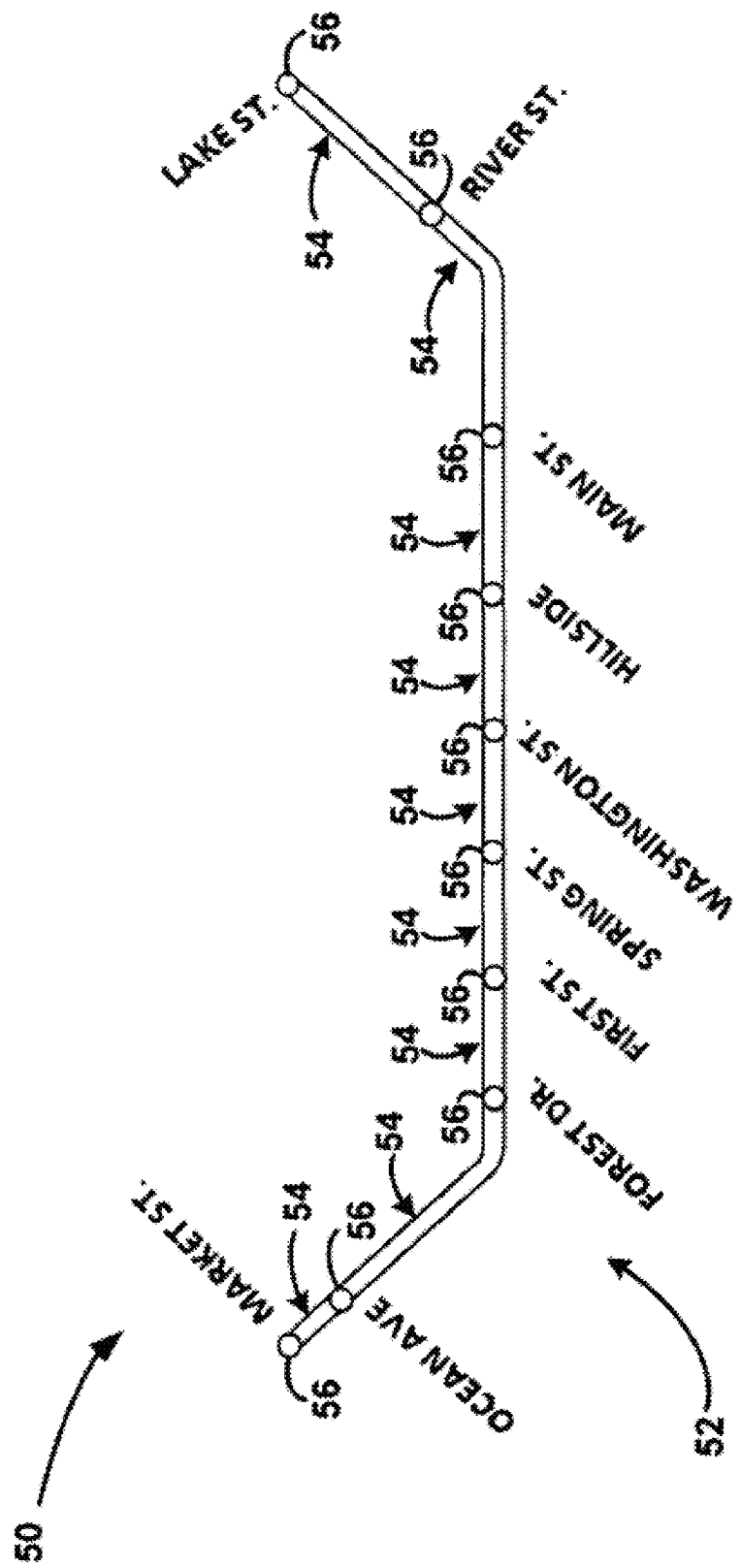
FIG. 4 shows a topological map that depicts a transit line, according to an example embodiment.

FIG. 4 shows a topological map 50 that depicts a transit line 52, according to an example embodiment. As shown, the topological map 50 may depict the transit line 52 as an ordered sequence of points 56 that represent stops or stations along the transit line 52. (As used herein, the terms "stop" and "station" may be used interchangeably). In this respect, the topological map 50 may also depict an identifier (e.g. a stop name) associated with each point. Further, as shown, the topological map 50 may depict simplified links 54 between points 56 that each represent an interconnection between the points 56.

While topological maps may help users visualize and navigate the topology of the depicted features, these maps currently do not incorporate the navigation-related functions and features available for maps-to-scale. As such, it would be desirable to provide users with navigation-related functions and features for a topological map.

V. Navigation System

Figure 5:
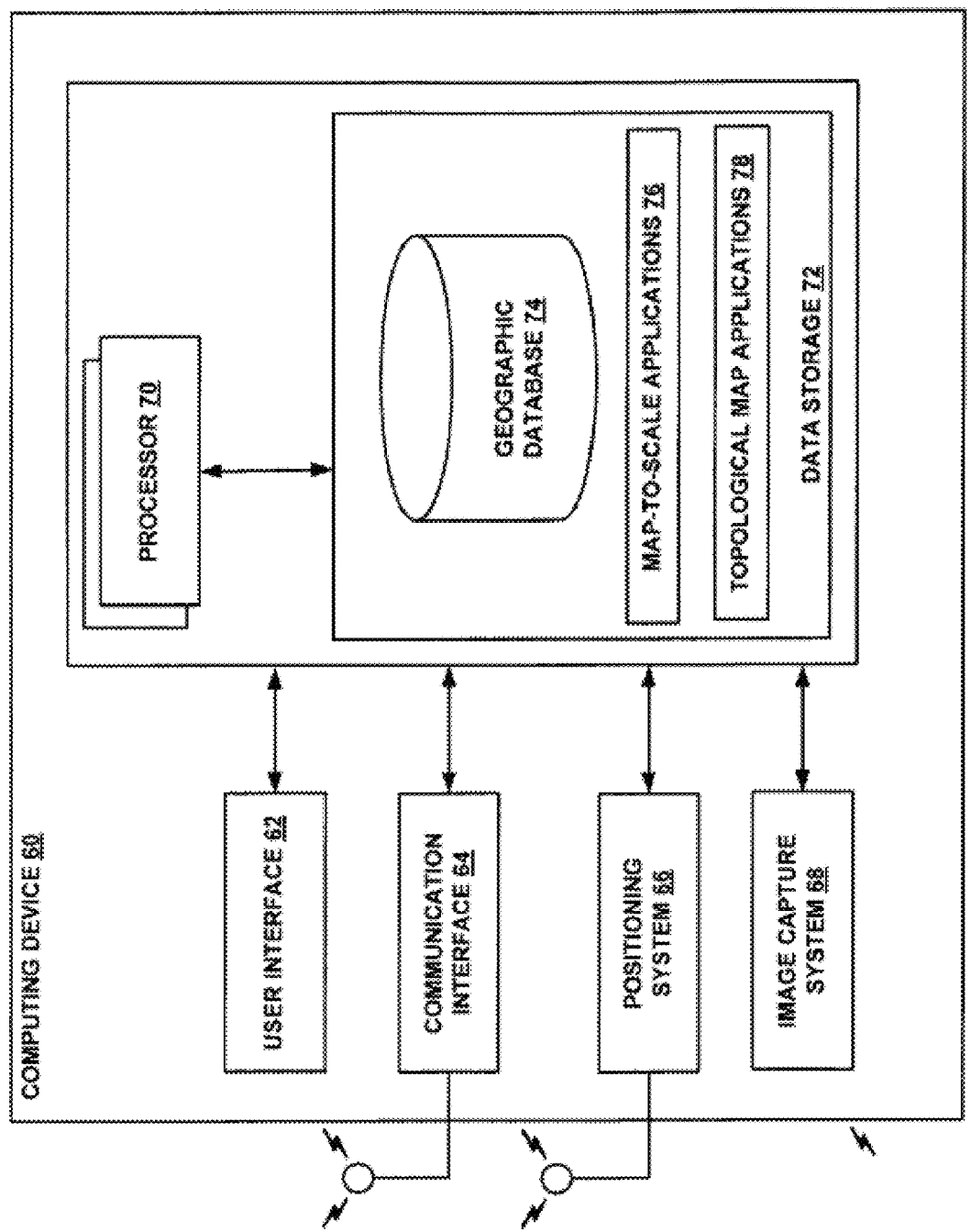
FIG. 5 is a block diagram of a computing device capable of operating as a navigation system, according to an example embodiment.

A user may access navigation-related functions and features for a topological map using a computing device that is capable of operating as a navigation system, such as a vehicle-installed navigation device, a handheld navigation device, a mobile telephone, a personal digital assistant (PDA), a personal computer, or a tablet for instance. FIG. 5 is a block diagram of a computing device 60 capable of operating as a navigation system, according to an example embodiment. As shown, the computing device 60 may include a user interface 62, a communication interface 64, a positioning system 66, and perhaps an image-capture system 68, each operatively coupled to a processor 70 and data storage 72. Other configurations are possible as well.

The user interface 62 may function to facilitate user interaction with the computing device 60, such as by allowing a user to input information into the computing device 60 and obtain information from the computing device 60. In this respect, the user interface 62 may include or provide connectivity to various input components, such as a touch screen, a navigation pad, a multi-functional button, a thumb wheel, a keyboard or keypad, and/or a microphone for instance. The user interface 62 may also include or provide connectivity to various output components, such as a display screen (e.g., which may display a graphical user interface (GUI)) and/or a speaker for instance. The user interface 62 may include or provide connectivity to other components for facilitating user interaction with the computing device 60 as well.

The communication interface 64 may function to communicatively couple the computing device 60 to one or more other devices via one or more links and/or networks (e.g., the Internet). In this respect, the communication interface 64 may take the form of an Ethernet interface, a serial bus interface (e.g., Firewire, USB 2.0, etc.), a chipset and antenna adapted to facilitate wireless communication according a desired protocol, and/or any other interface that provides for wireless and/or wired communication with another device. The communication interface 64 may also include multiple communication interfaces, such as one serial bus interface and one chipset and antenna adapted to facilitate wireless communication according a desired protocol. Other configurations are also possible.

The positioning system 66 may function to track and generate position data representing a position of the computing device 60 according to a given coordinate system, such as a geographical coordinate system (e.g., WGS84). In this respect, the positioning system 66 may employ any technology now known or later developed, including GPS-type technology, dead reckoning-type technology, or a combination of these or other technologies, all of which are known in the art. Further, the positioning system 66 may include various components, including a GPS receiver, an inertial measurement unit (IMU), wheel-rotation sensors, steering-direction sensors, and/or any other device that enables tracking of the computing device's position. Further yet, the position data may take various forms, including data indicating geographic location (e.g., latitude and longitude), orientation, and/or speed of the computing device 60 for instance.

The image-capturing system 68 may function to capture a digital image. In this respect, the image-capturing system 68 may include various components to facilitate image capture, including a lens, an imager (e.g., a charge-coupled device (CCD) or complimentary metal oxide semiconductor (CMOS) sensor), and a recorder. Further, the image-capturing system 68 may capture the image in various formats, including Tagged Image File Format (TIFF), Joint Photographic Experts Group (JPEG), and/or RAW. Other examples are possible as well.

The processor 70 may function to execute or interpret program instructions (which may be arranged into one or more applications) that enable the processor 70 to carry out various tasks. In this respect, the processor 66 may take the form of one or more processor components, such as general-purpose processors (e.g., a microprocessor), application-specific processors (e.g., an application-specific integrated circuit (ASIC) or digital signal processor (DSP)), programmable logic devices (e.g., a field programmable gate array (FPGA)), or other processor components now known or later developed. Other configurations are possible as well.

Data storage 72 may function to store various types of program instructions and data that can be read by the processor 70. In this respect, data storage 72 may take the form of one or more data storage mediums, such as volatile data storage mediums (e.g., random access memory (RAM), registers, and/or cache) and/or non-volatile data storage mediums (e.g., read only memory (ROM), a hard disk drive, a solid state drive, flash memory, an optical storage device, and/or a floppy disk). Some data storage mediums may be integrated in whole or in part with the processor 70. Further, some data storage mediums may be external to and/or removable from the computing device 60, and may interface with the computing device 60 in various manners (e.g., via the communication interface 64, a drive, or a reader). Other configurations are possible as well.

Data storage 72 may contain a map-to-scale database 74, which may be generated from the map-to-scale database 20 described above. The map-to-scale database 74 may be in one of various compiled formats. In one example, the map-to-scale database 74 may be a database published by NAVTEQ North America, LLC of Chicago, Ill. The map-to-scale database 74 may be stored in various components of data storage 72. For example, the map-to-scale database 74 may be stored in a non-volatile data storage medium (e.g., a hard disk drive or a removable storage component installed in a drive) and then loaded into a volatile data storage medium (e.g., RAM) when operated on by the processor 70. Other examples are possible as well. In an alternative aspect, the map-to-scale database 74 may be stored remotely from the computing device 60, in which case the computing device 60 may access the map-to-scale database 74 via the communication interface 64. Other examples are possible as well.

Additionally, data storage 72 may contain one or more applications that enable the computing device 60 to provide navigation-related features and functions to a user. During execution of the one or more applications, the processor 70 may perform various tasks and may use data from various sources, including the user interface 62, the communication interface 64, the positioning system 66, the image-capture system 68, and/or data storage 72 (e.g., the map-to-scale database 74). The one or more applications may be stored in various components of data storage 72. For example, the one or more applications may be stored in a non-volatile data storage medium (e.g., a hard disk drive or a removable storage component installed in a drive) and then loaded into a volatile data storage medium (e.g., RAM) when operated on by the processor 70. Other examples are possible as well.

In one aspect, data storage 72 may contain one or more map-to-scale applications 76 that enable the computing device 60 to provide navigation-related features and functions for a map-to-scale. These map-to-scale applications 76 and the tasks performed by the processor 70 during their execution may take various forms. In one example, the map-to-scale applications 76 may include an application that enables the computing device 60 to display a map-to-scale of a region. In another example, the map-to-scale applications 76 may include an application that enables the computing device 60 to access and/or provide map-related or location-related information in a map-to-scale. Map-related and location-related information includes route calculation, route guidance, destination selection, positioning, geocoding, and location-based search, as well as other applications. Other examples are possible as well.

In another aspect, data storage 72 may contain one or more topological map applications 78 that enable the computing device 60 to provide navigation-related features and functions for a topological map, such as the topological map 50 depicted in FIG. 4. These topological map applications 78 and the tasks performed by the processor 70 during their execution may take various forms. In one example, the topological map applications 78 may include an application that enables the computing device 60 to display a topological map of a region. In this respect, the computing device 60 may display the topological map together with a map-to-scale, such as by displaying the topological map as an inset on the map-to-scale. In another example, the topological map applications 78 may include one or more applications that enable the computing device 60 to provide location-related information with respect to a topological map.

Figure 6:
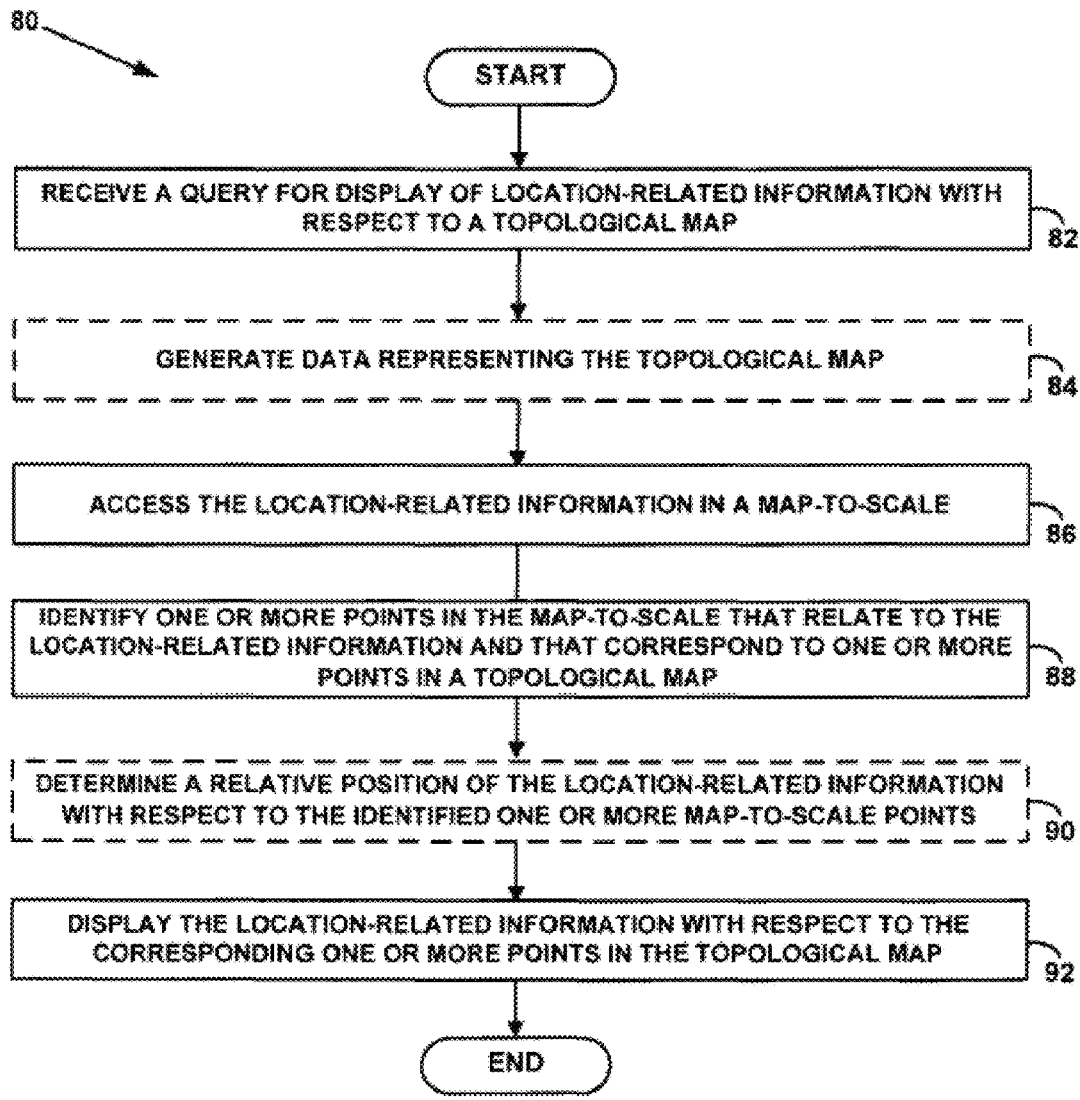
FIG. 6 is a flow chart depicting a method of providing location-related information with respect to a topological map, according to one example embodiment.

FIG. 6 is a flow chart depicting a method 80 of providing location-related information with respect to a topological map, according to one example embodiment. For purposes of illustration, the following description will assume that the computing device 60 carries out the method 80 while executing a topological map application 78. It should be understood, however, that other systems or devices may carry out one or more steps of the method 80 without departing from the scope of the example embodiment.

At step 82, the computing device 60 may receive a query for location-related information. The query may take various forms. In one example, the query may be input by user via the user interface 62, and may take the form of text, speech, initiation of an application, or selection of an icon or link within an application. In another example, the query may be initiated by an application on the computing device 60 without user input. The query may take other forms as well.

The location-related information may also take various forms. In one example, the location-related information may include one or more particular locations, such as the current location of the computing device 60, a destination input by a user, and/or locations of relevant POIs (e.g., POIs matching search criteria input by a user). In another example, the location-related information may include information associated with one or more particular locations, such as identifying information (e.g., POI names) or dynamic content (e.g., number of taxi cabs at the location). In yet example, the location-related information may include a route between any two particular locations. The location-related information may take many other forms as well.

In addition to identifying the location-related information, the query may also include other information. In one example, the query may include and/or identify a digital image of the topological map, such as a digital image captured by the image-capture system 68 and/or stored in data storage 72. In another example, the query may include search criteria input by a user that is related to the location-related information (e.g., search criteria for identifying relevant POIs). Other examples are possible as well.

At step 84, after receiving the query, the computing device 60 may optionally generate data representing the topological map. The computing device 60 may generate the data representing the topological map in various manners. In one example, the computing device 60 may first obtain a digital image of the topological map from various sources, such as the image-capture system 68, data storage 72, and/or another computing device. In turn, the computing device 60 may process the obtained digital image to generate the data representing the topological map using any technique now known or later developed, including optical character recognition (OCR), flood-fill, and/or curve-fitting (e.g., interpolation) techniques. The data representing the topological map may take various forms. As one example, the data representing the topological map may include data representing relevant points in the topological map, such as the transit line points 56 in the topological map 50. As another example, the data representing the topological map may include data representing relevant links in the topological map, such as the transit line links 54 in the topological map 50. Other examples are possible as well.

In an alternative aspect, however, the computing device 60 and/or another device (e.g., a server operated by a map developer) may generate data representing the topological map before the query. In this respect, the computing device 60 may maintain and/or have access to predefined topological map data.

At step 86, the computing device 60 may access the location-related information in a map-to-scale. In this respect, the computing device 60 may first obtain the map-to-scale in one of various manners. For example, the computing device 60 may obtain predefined data representing the map-to-scale (e.g., the map-to-scale database 74) from various sources, such as data storage 72 and/or another computing device. As another example, the computing device 60 may obtain a digital image of the map-to-scale from various sources, such as the image-capture system 68, data storage 72, and/or another computing device. In this respect, after obtaining the digital image of the map-to-scale, the computing device 60 may then process the digital image to generate data representing the map-to-scale. Other examples are possible as well.

After obtaining the map-to-scale, the computing device 60 may access the location-related information in the map-to-scale in various manners. In one example, if the located-related information includes the computing device's current location, the computing device 60 may access the computing device's current location in the map-to-scale using the current location as determined by the positioning system 66 and the map-to-scale database 74. In another example, if the located-related information includes a destination input by the user via the user interface 62, the computing device 60 may access the destination in the map-to-scale using the user's input and the map-to-scale database 74. In yet another example, if the located-related information includes locations of relevant POIs, the computing device 60 may access the locations of the relevant POIs in the map-to-scale using a reference location, search criteria for identifying relevant POIs (e.g., coffee houses within 1 mile of the reference location), and the map-to-scale database 74. In a further example, if the location-related information includes a route between the computing device's current location and a destination input by a user, the computing device 60 may access the route in the map-to-scale using the current location as determined by the positioning system 66, the user's input, and the map-to-scale database 74. Many other examples are possible as well.

While accessing the location-related information in the map-to-scale, the computing device 60 may also use the map-to-scale to determine other relevant information for the accessed location-related information. For example, the computing device 60 may use the map-to-scale database 74 to determine whether the accessed location-related information is co-located with any other features (e.g., roads, transit lines, etc.). If so, the computing device 60 may also determine information about any such features (e.g., street name, transit line name, etc.). Other examples are possible as well.

At step 88, the computing device 60 may identify one or more points in the map-to-scale that relate to the location-related information and that correspond to one or more points in a topological map. To perform this identification, the computing device 60 may rely on the accessed location-related information, the map-to-scale database 74, and an association between one or more points in the map-to-scale and corresponding one or more points in the topological map. For example, if the accessed located-related information is a particular location in the map-to-scale, the computing device 60 may identify one or more nearest map-to-scale points that have corresponding topological map points. As another example, if the accessed located-related information is a route between two locations, the computing device 60 may identify a plurality of map-to-scale points on and/or near the route that have corresponding topological map points. Other examples are possible as well.

As indicated above, to identify the one or more map-to-scale points that relate to the location-related information and that correspond to one or more topological map points, the computing device 60 may rely on an association between one or more points in the map-to-scale and one or more corresponding points in the topological map. In one aspect, the computing device 60 may determine the point association in response to the query. In this respect, the computing device may determine the point association using various techniques. For example, the computing device 60 may determine the association based on names (or other identifying information) of points in the topological map and the map-to-scale. In this respect, the computing device 60 may use the data representing the topological map to identify a name associated with a topological map point and may then search the map-to-scale database 74 to identify a point having the same name. In another example, computing device 60 may determine the association based on topology information for points in the topological map and map-to-scale. In this respect, the computing device 60 may use the data representing the topological map to determine a relative order of a topological map point within a depicted network (e.g., a transit line) and then search the map-to-scale database 74 to identify a point having the same relative order within the same network. The computing device 60 may determine the association in other manners as well.

In an alternative aspect, however, the computing device 60 and/or another device (e.g., a server operated by a map developer) may determine the association between the one or more map-to-scale points and the corresponding one or more topological map points before the query.

In this respect, the computing device 60 may maintain and/or have access to predefined point association data, which may take various forms. In one example, the point association data may take the form of a separate database that stores map-to-scale point identifiers with corresponding topological map point identifiers. In another example, the point association data may take the form of an index that associates map-to-scale point data records with data representing corresponding topological map points. In yet another example, the point association data may take the form of map-to-scale point identifiers stored within the data representing corresponding topological map points. In a further example, the point association data may take the form of topological map point identifiers stored within corresponding map-to-scale point data records. Other examples are possible as well.

At step 90, the computing device 60 may optionally determine a relative position of the location-related information with respect to the identified one or more map-to-scale points. The computing device 60 may perform the determination using various techniques. In one example, if the location-related information includes a particular location, the computing device 60 may determine a position of the location relative to the identified one or more map-to-scale points. In another example, if the location-related information includes a route, the computing device 60 may determine a position of the origin and/or destination of the route relative to the identified one or more map-to-scale points. Other examples are possible as well. After determining the relative position of the location-related information with respect to the identified one or more map-to-scale points, the computing device 60 may also determine whether the location-related information can be displayed in the topological map based on the relative position (e.g., the computing device 60 may decide that the location-related information cannot be displayed if it is too far from any map-to-scale point having a corresponding topological map point).

The computing device 60 may represent the relative position of the location-related information with respect to the identified one or more map-to-scale points in various manners. In one example, the relative position may be represented in terms of distance, such as a length (e.g., 100 feet) and/or a classification (e.g., walking distance, driving distance, etc.) of the distance between the location-related information and the identified one or more map-to-scale points. In another example, the relative position may be represented in terms of direction, such as a rotational angle (37 degrees) and/or a classification (e.g., a cardinal direction) of the direction of the location-related information relative to the identified one or more map-to-scale points. Other examples are possible as well.

At step 92, the computing device 60 may display the location-related information with respect to the corresponding one or more points in the topological map. The computing device 60 may display the location-related information using various rendering techniques. In one example, the computing device 60 may display an augmented reality view in which the location-related information is superimposed on the original topological map. In this respect, the computing device 60 may additionally superimpose other information that relates to the location-related information, such as highlighting for topological map points related to the location-related information and/or a map-to-scale portion that depicts an area near the location-related information. In another example, the computing device 60 may display an updated topological map that includes the location-related information. In this respect, the updated topological map may additionally include other information that relates to the location-related information, such as highlighting for topological map points related to the location-related information and/or a map-to-scale portion that depicts an area near the location-related information. Other examples are possible as well.

When displaying the location-related information with respect to the corresponding one or more topological map points, the computing device 60 may depict the location-related information at various positions relative to the one or more topological map points. In one aspect, if the location-related information includes a particular location in close proximity to the nearest identified map-to-scale point, the computing device 60 may simply depict the location as being positioned at the corresponding topological map point. In this respect, the computing device 60 may also indicate the relative position of the location with respect to the map-to-scale point by using different icons to represent the location at the corresponding topological map point. For example, depending on the distance between the location and the map-to-scale point, the computing device 60 may vary the color and/or size of the icon representing the location at the corresponding topological map point. Other examples are possible as well.

In another aspect, if the location-related information includes a particular location that is in moderate proximity to the nearest identified map-to-scale point, the computing device 60 may depict the particular location as being positioned away from the corresponding topological map point. In this respect, the computing device 60 may determine where to position the location relative to the corresponding topological map point in various manners. In one example, the computing device 60 may determine the relative position of the location with respect to the corresponding topological map point based on the relative position of the location with respect to at least the nearest map-to-scale point, and perhaps one or more other proximate map-to-scale points. Other examples are possible as well.

In yet another aspect, if the location-related information includes a particular location positioned on a map-to-scale link connecting two map-to-scale points (e.g., as determined at step 86), the computing device 60 may depict the particular location as being positioned in a topological map link connecting the two corresponding topological map points. In this respect, the computing device 60 may determine the relative position of the location along the topological map link using various techniques. In one example, the computing device 60 may simply use a predefined relative distance along the topological map link (e.g., 50% along the link). In another example, the computing device 60 may determine the relative position of the location along the topological map link based on the relative position of the location with respect to the topological map points at either end of the topological map link, which may be determined based on the relative position of the location with respect to the map-toscale points at either end of the map-to-scale link. Other examples are possible as well.

In still another aspect, if the location-related information includes a route segment that runs between two map-to-scale points connected by a map-to-scale link, the computing device 60 may depict the route segment as being positioned between the corresponding two topological map points along the connecting topological map link. Similarly, if the location-related information includes a route segment that runs between two map-to-scale points that are not connected by a map-to-scale link, the computing device 60 may depict the route segment as being positioned between the corresponding two topological map points along an imaginary segment between the points.

Figure 7:
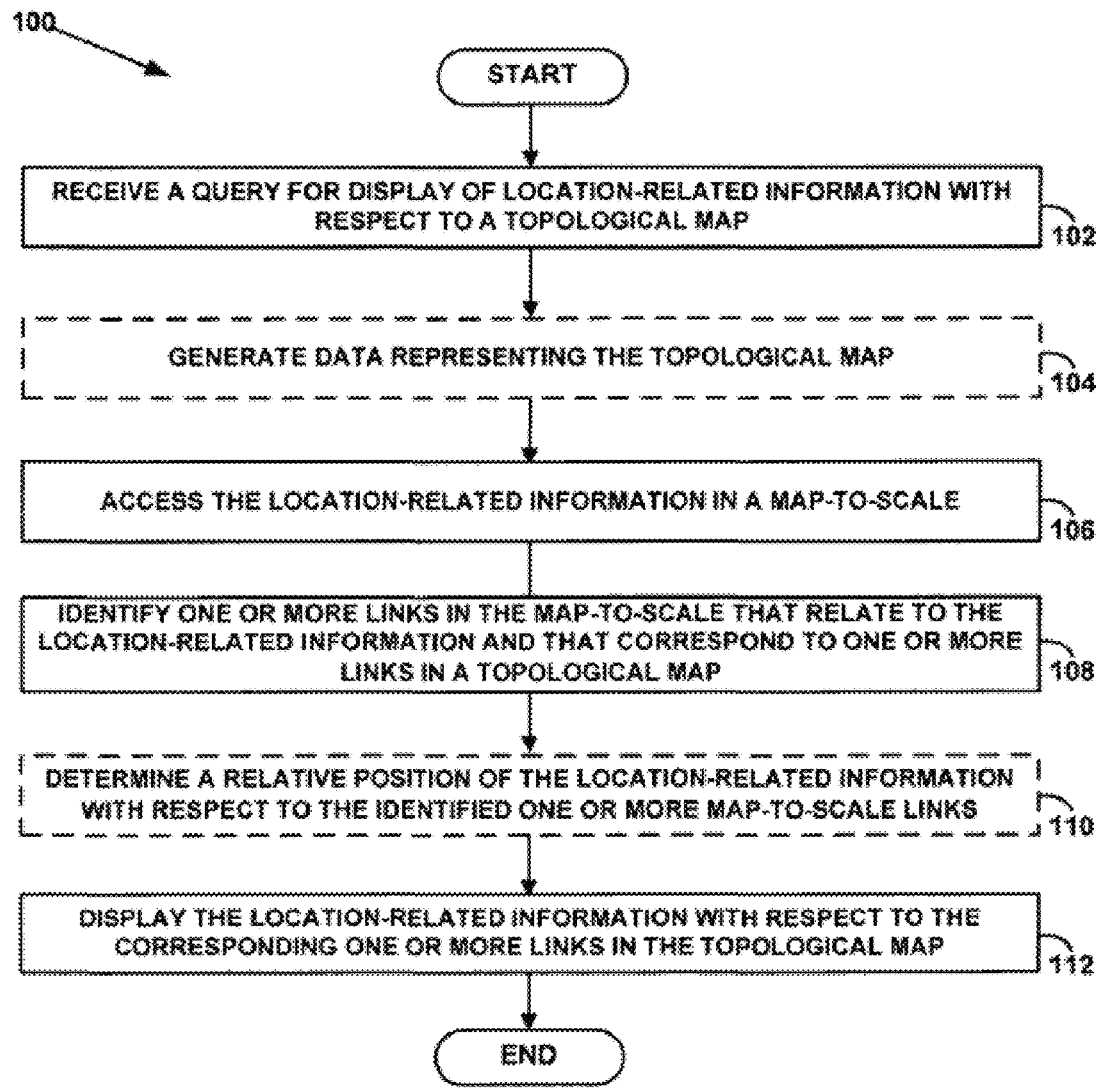
FIG. 7 is a flow chart depicting a method of providing location-related information with respect to a topological map, according to another example embodiment.

FIG. 7 is a flow chart depicting a method 100 of providing a user with location-related information with respect to a topological map, according to another example embodiment. As above, for purposes of illustration, the following description will assume that the computing device 60 carries out the method 100 while executing a topological map application 78. It should be understood, however, that other systems or devices may carry out one or more steps of the method 100 without departing from the scope of the example embodiment.

Steps 102-106 may be substantially similar to steps 82-86 of the method 80 depicted in FIG. 6. In particular, at step 102, the computing device 60 may receive a query for display of location-related information with respect to a topological map. At step 104, the computing device 60 may optionally generate data representing the topological map in response to the query. At step 106, the computing device 60 may access the location-related information in a map-to-scale, during which time the computing device 60 may also use the map-to-scale to determine other relevant information for the accessed location-related information (e.g., whether the accessed location-related information is co-located with any other map-to-scale features).

At step 108, the computing device 60 may identify one or more links in the map-to-scale that relate to the location-related information and that correspond to one or more links in the topological map. To perform this identification, the computing device 60 may rely on the accessed location-related information, the map-to-scale database 74, and an association between one or more links in the map-to-scale and corresponding one or more links in the topological map. For example, if the accessed located-related information is a particular location in the map-to-scale, the computing device 60 may identify a map-to-scale link at or near the particular location that has a corresponding topological map link. As another example, if the accessed located-related information is a route between two locations, the computing device 60 may identify a plurality of map-to-scale links along the route that have corresponding topological map links. Other examples are possible as well.

As indicated above, to identify the one or more map-to-scale links that relate to the location-related information and that correspond to one or more topological map links, the computing device 60 may rely on an association between one or more links in the map-to-scale and corresponding one or more links in the topological map. In one aspect, the computing device 60 may determine the link association in response to the query. In this respect, the computing device 60 may determine the link association using various techniques. For example, the computing device 60 may determine the association between the map-to-scale and topological map links based on an association between endpoints of map-to-scale links and endpoints of corresponding topological map links. In this respect, the computing device 60 may use the data representing the topological map to identify the endpoints of a topological map link. In turn, the computing device 60 may identify the corresponding endpoints in the map-to-scale, such as by relying on previously-generated point association data and/or determining an association between the identified topological map endpoints and the corresponding map-to-scale endpoints using various techniques, including those described above with reference to step 88. After identifying the corresponding map-to-scale endpoints, the device 60 may then use the map-to-scale database 74 to identify the corresponding map-to-scale link between the identified map-to-scale endpoints. Other examples are possible as well.

In an alternative aspect, however, the computing device 60 and/or another device (e.g., a server operated by a map developer) may determine the association between the one or more map-to-scale links and the corresponding one or more topological map links before the query. In this respect, the computing device 60 may maintain and/or have access to predefined data indicating the link associations, which may take various forms. In one example, the link association data may take the form of a separate database that stores map-to-scale link identifiers with corresponding topological map link identifiers. In another example, the link association data may take the form of an index that associates map-to-scale link data records with data representing corresponding topological map links. In yet another example, the link association data may take the form of map-to-scale link identifiers stored within the data representing corresponding topological map links. In a further example, the link association data may take the form of topological map link identifiers stored within corresponding map-to-scale link data records. Other examples are possible as well.

At step 110, the computing device 60 may optionally determine a relative position of the location-related information with respect to the identified one or more map-to-scale links. The computing device 60 may perform the determination using various techniques, including interpolation. In one example, if the location-related information includes a particular location on a map-to-scale link, the computing device 60 may determine the position of the particular location relative to one or both endpoints of the map-to-scale link. In another example, if the location-related information includes a particular location off any map-to-scale link, the computing device 60 may determine a position of the location relative to one or more reference points on the map-to-scale link. Other examples are possible as well.

The computing device 60 may represent the relative position of the location-related information with respect to the identified one or more map-to-scale links in various manners. In one example, the relative position may be represented in terms of distance, such as a ratio of the distance along a map-to-scale link between the location-related information and the link's reference endpoint versus the total distance along the map-to-scale link (e.g., 30% from the reference endpoint). In another example, the relative position may be represented in terms of time, such as a ratio of the time needed to travel along a map-to-scale from the link's reference endpoint to the location-related information versus the total time needed to travel along the map-to-scale link. Other examples are possible as well.

At step 112, the computing device 60 may display the location-related information with respect to the corresponding one or more links in the topological map. In this respect, the computing device 60 may display the location-related information using various rendering techniques, including those described above with reference to step 90.

When displaying the location-related information with respect to the corresponding one or more topological map links, the computing device 60 may depict the location-related information at various positions relative to the one or more topological map links. In one aspect, if the location-related information includes a particular location positioned on a map-to-scale link, the computing device 60 may depict the particular location as being positioned on the corresponding topological map link. In this respect, the computing device 60 may determine the relative position of the location along the topological map link using various techniques, including interpolation. In one example, the computing device 60 may simply use a predefined relative distance along the topological map link (e.g., 50% along the link). In another example, the computing device 60 may determine the relative position of the location along the corresponding topological map link based on the relative position of the location along the map-to-scale link (e.g., if the location is 30% along the map-to-scale link then the computing device 60 may depict the location at 30% along the corresponding topological map link). Other examples are possible as well.

In another aspect, if the location-related information includes a particular location positioned off a map-to-scale link, the computing device 60 may depict the particular location as being positioned off the corresponding topological map link. In this respect, the computing device 60 may determine where to position the location relative to the corresponding topological map link in various manners. In one example, the computing device 60 may determine the relative position of the location with respect to the corresponding topological map link based on the relative position of the location with respect to at least one reference point on the map-to-scale link. Other examples are possible as well.

In yet another aspect, if the location-related information includes a route segment that runs along one or more map-to-scale links, the computing device 60 may depict the route as being positioned along the corresponding one or more topological links. Other examples are possible as well.

By employing the method 80 depicted in FIG. 6 and/or the method 100 depicted in FIG. 7, the computing device 60 may be able to display various types of location-related information in various manners with respect to a topological map. FIGS. 8A-8O illustrate some example displays with respect to the topological map 50 depicted in FIG. 4.

Figure 8E:
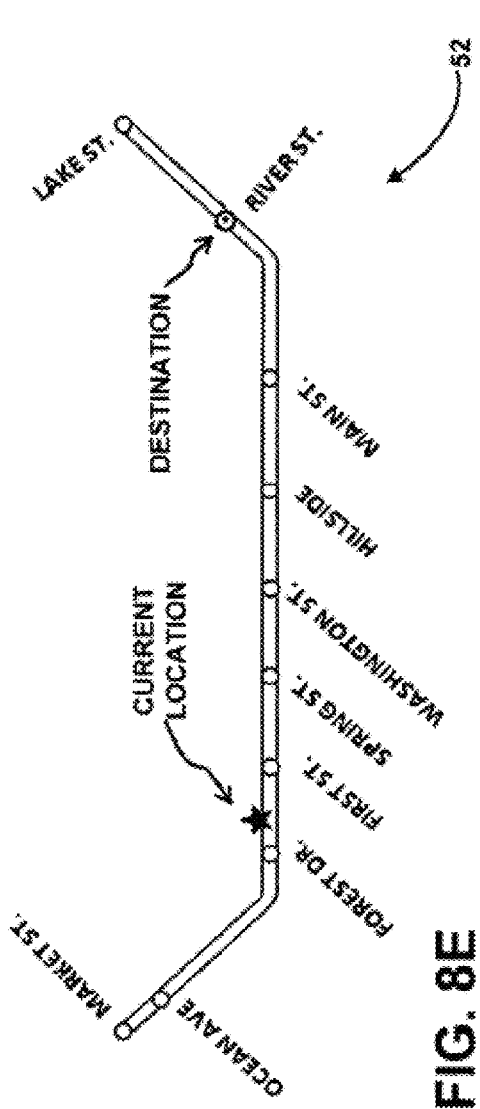
FIGS. 8A-8O illustrate some example displays with respect to the topological map depicted in FIG. 4.

For example, FIGS. 8A-8E illustrate displays of one or more particular locations with respect to the topological map 50 depicted in FIG. 4. In particular, FIG. 8A illustrates an example display of the computing device's current location as being positioned on the transit line 52 between the Forrest Dr. and First St. stops, nearest to the Forrest Dr. stop. FIG. 8B illustrates an example display of the computing device's current location as being positioned off the transit line 52 and nearest to the First St. stop. FIG. 8C illustrates an example display of a destination that is positioned off the transit line 52 and nearest to the River St. stop. FIG. 8D illustrates an example display of multiple POIs matching search criteria that are all positioned off the transit line 52 and nearest either the Main St. or River St. stop. FIG. 8E illustrates an example display of both the computing device's current location as being positioned on the transit line 52 near the Forrest Dr. stop and a destination that is positioned on the transit line 52 at the River St. stop.

Figure 8F:
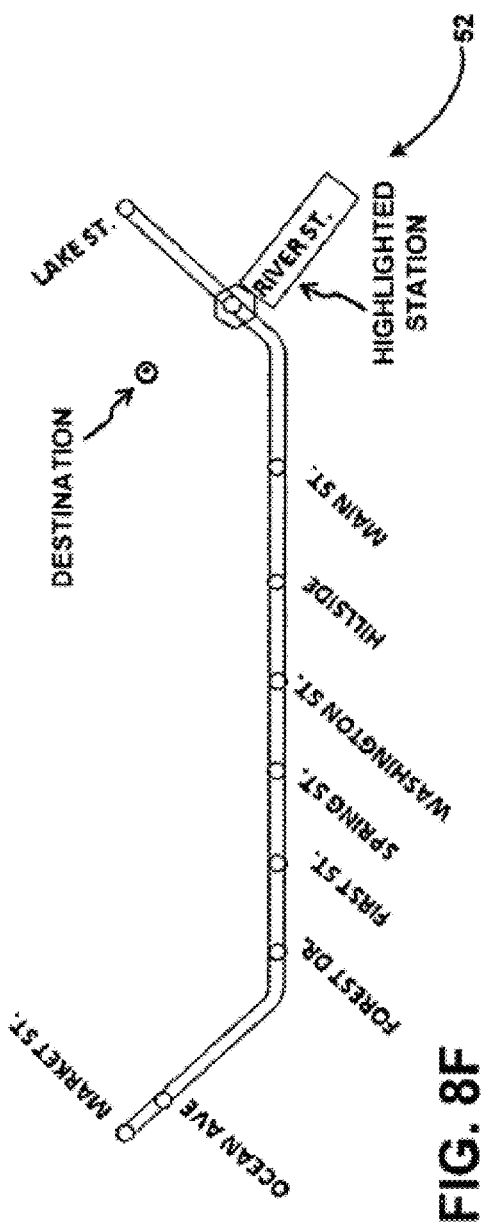
Figure 80:
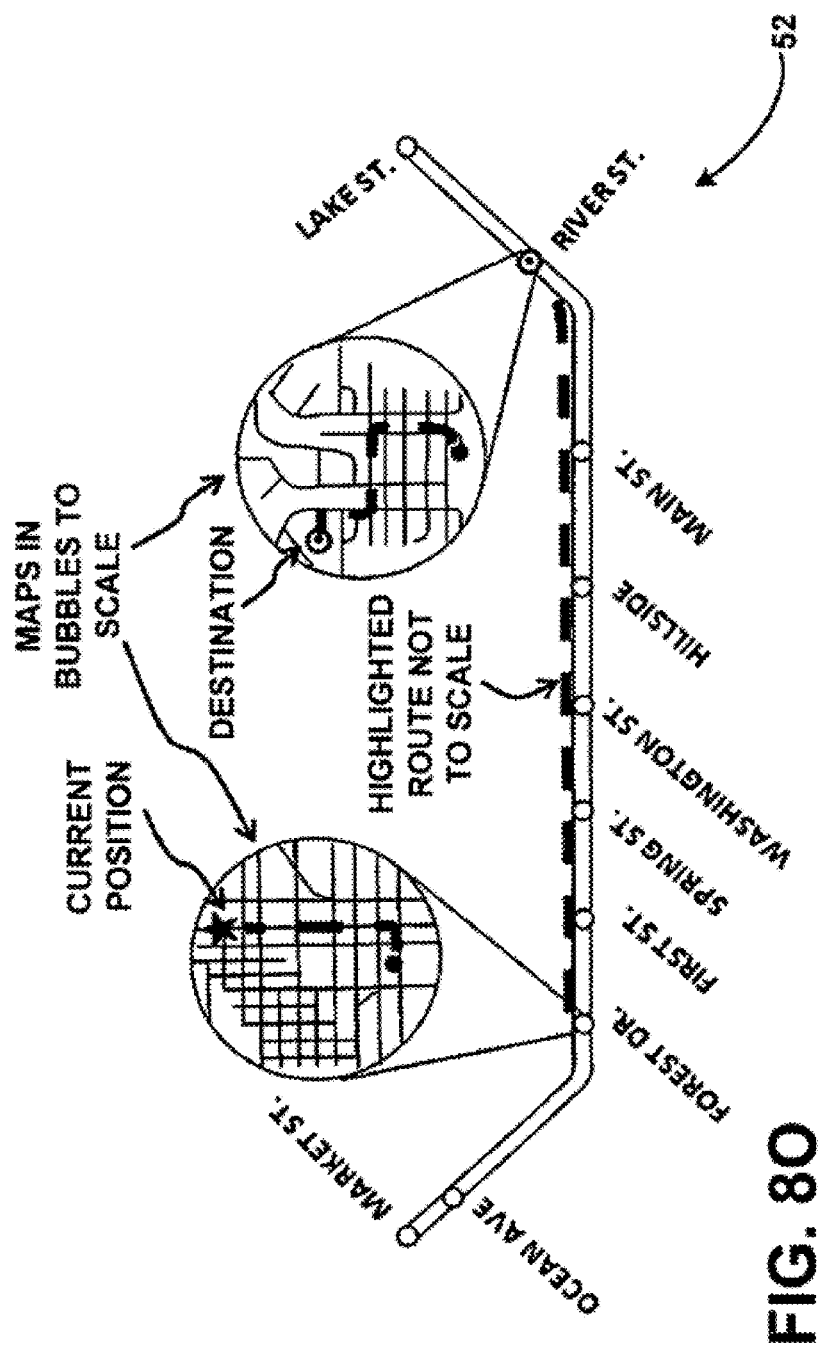

As another example, FIGS. 8F-8H illustrate displays of one or more particular locations with respect to the topological map 50 depicted in FIG. 4, with points related to the displayed locations highlighted. In particular, FIG. 8F illustrates an example display of a destination that is positioned off the transit line 52 and nearest to the River St. stop, with the River St. stop highlighted. FIG. 8G illustrates an example display of multiple POIs matching search criteria that are all positioned off the transit line 52 and nearest either the Main St. or River St. stop, with the Main St. or River St. stops highlighted. FIG. 8H illustrates an example display of both the computing device's current location as being positioned on the transit line 52 between the Forrest Dr. and First St. stops and a destination that is near the River St. stop, with the River St. stop highlighted.

As yet another example, FIGS. 8I-8J illustrate displays of a highlighted route between two locations in the topological map 50 depicted in FIG. 4. In particular, FIG. 8I illustrates an example display of a highlighted route being positioned entirely on the transit line 52 from the device's current location between the Forrest Dr. and First St. stops to a destination at the River St. stop. FIG. 8J illustrates an example display of a highlighted route being positioned on the transit line 52 from the device's current location between the Forrest Dr. and First St. stops to the highlighted River St. stop, and then off the transit line 52 from the River St. stop to the destination.

As a further example, FIGS. 8K-8N illustrate displays of the topological map 50 depicted in FIG. 4 with map-to-scale overlays depicting certain areas off the transit line 52. In this respect, as shown, the computing device 60 may display location-related information in the map-to-scale overlays. In particular, FIG. 8K illustrates an example display of the topological map 50 of the transit line 52 along with map-to-scale overlays depicting areas near the Forrest Dr. and River St. stops. FIG. 8L illustrates an example display of the computing device's current location being positioned off the transit line 52 near the Forrest Dr. stop, along with a first map-to-scale overlay depicting the area between the current location and the Forrest Dr. stop and a second map-to-scale overlay depicting an area near the River St. stop. FIG. 8M illustrates an example display of multiple POIs matching search criteria that are all positioned off the transit line 52, along with map-to-scale overlays depicting the areas between each POI and its nearest stop (e.g., Hillside, Main St., or River St). FIG. 8N illustrates an example display of a highlighted route between the computing device's current location that is positioned off the transit line 52 near the Forrest Dr. stop and a destination that is positioned off the transit line 52 near the River St. stop, along with map-to-scale overlays depicting the area between the current location and the Forrest Dr. stop and the destination and the River St. stop.

As still a further example, FIG. 8O illustrates a display of the topological map 50 depicted in FIG. 4 with map-to-scale bubbles depicting certain areas on and/or off the transit line 52. In particular, FIG. 8O illustrates an example display of a highlighted route between the computing device's current location that is positioned off the transit line 52 near the Forrest Dr. stop and a destination that is positioned off the transit line 52 near the River St. stop, along with a first map-to-scale bubble extending from the Forrest Dr. stop depicting the area surrounding and between the current location and the Forrest Dr. stop and a second map-to-scale bubble extending from the River St. stop depicting the area surrounding and between the River St. stop and the destination.

V. Map Developer Server

As described above, when providing location-related information with respect to a topological map, the computing device 60 may rely on a predefined data representing a topological map and/or predefined data associating one or more map-to-scale points and/or links with one or more corresponding topological map points and/or links. In this respect, a map developer may generate the predefined topological map data and/or predefined association data on one or more computing devices, such as a personal computer or a server computer.

Figure 9:
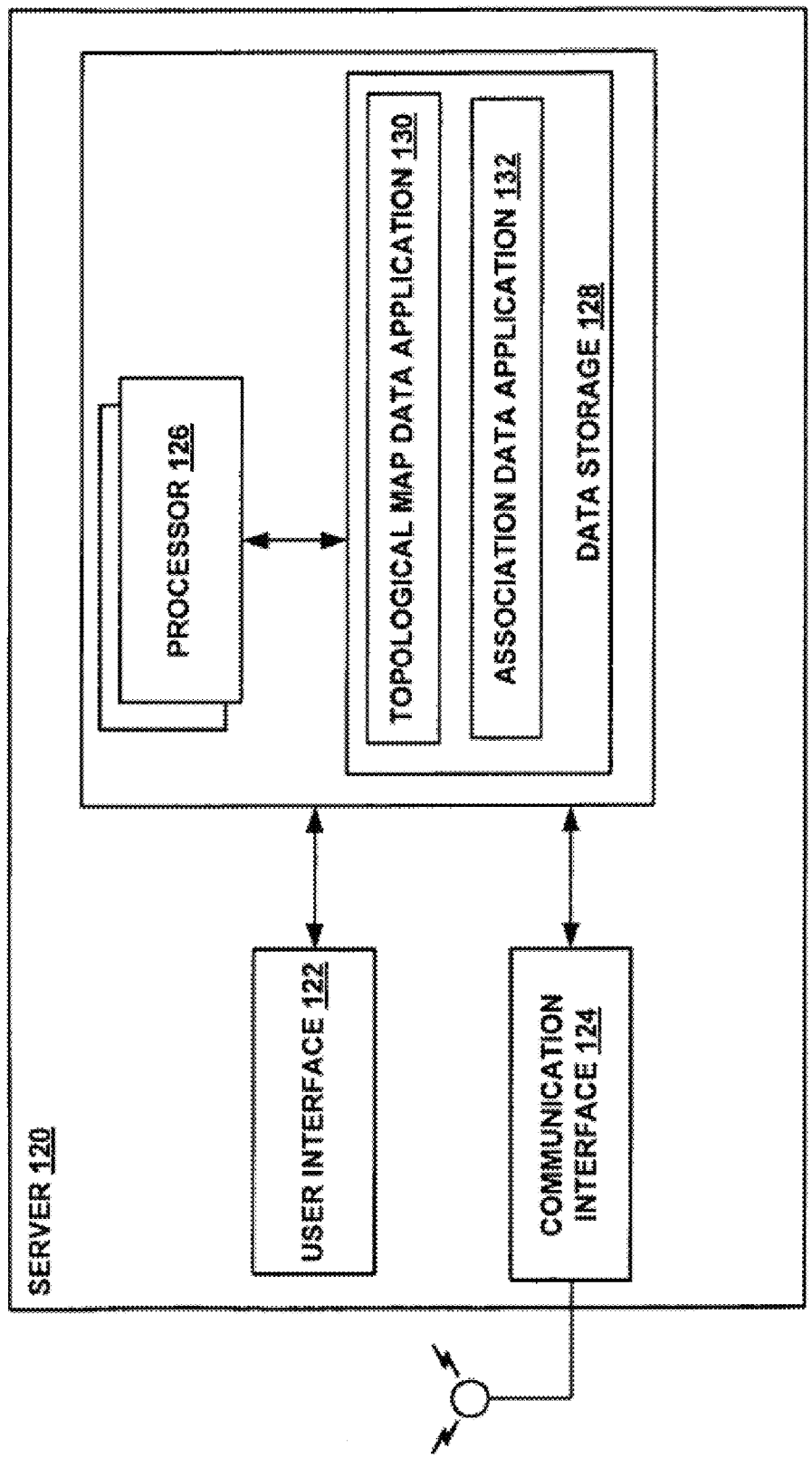
FIG. 9 is a block diagram of a server capable of generating predefined topological map data and/or predefined association data, according to an example embodiment.

FIG. 9 is a block diagram of a server 120 capable of generating predefined topological map data and/or predefined association data, according to an example embodiment. As shown, the server 120 may include a user interface 122 and a communication interface 124, each operatively coupled to a processor 126 and data storage 128. The server 120 may include other components as well.

The user interface 122 may function to facilitate user interaction with the server 120, such as by allowing a user to input information into the server 120 and obtain information from the server 120. In this respect, the user interface 122 may include or provide connectivity to various input components, such as a keyboard, a mouse, and/or a microphone for instance. The user interface 122 may also include or provide connectivity to various output components, such as a display screen and/or a speaker for instance. The user interface 122 may include or provide connectivity to other components for facilitating user interaction with the server 120 as well.

The communication interface 124 may function to communicatively couple the server 120 to one or more other devices, such as a device maintaining the map-to-scale database 20 and/or one or more navigation systems for instance. In this respect, the communication interface 124 may take the form of one or more interfaces that provide for wireless and/or wired communication with another device, such as an Ethernet interface, a serial bus interfaces (e.g., Firewire, USB 2.0, etc.), a chipset and antenna adapted to facilitate wireless communication according a desired protocol, or any other such interfaces now known or later developed. Other configurations are also possible.

The processor 126 may function to execute or interpret program instructions (which may be arranged into an application) that enable the processor 126 to carry out various tasks. In this respect, the processor 126 may take the form of one or more processor components, such as general-purpose processors (e.g., a microprocessor), application-specific processors (e.g., an ASIC or DSP), programmable logic devices (e.g., FPGA), or other processor components now known or later developed. Other configurations are possible as well.

Data storage 128 may function to store various types of program instructions and data that can be read by the processor 126. In this respect, data storage 128 may take the form of one or more data storage mediums, such as volatile data storage mediums (e.g., RAM, registers, and/or cache) and/or non-volatile data storage mediums (e.g., ROM, a hard disk drive, a solid state drive, flash memory, an optical storage device, and/or a floppy disk). Some data storage mediums may be integrated in whole or in part with the processor 126. Further, some data storage mediums may be external to and/or removable from the server 120, and may interface with the server 120 in various manners (e.g., via the communication interface 124, a drive, or a reader). Other configurations are possible as well.

Data storage 128 may contain one or more applications that enable the server 120 to generate predefined topological map data and/or predefined association data. The one or more applications may be stored in various components of data storage 128. For example, the one or more applications may be stored in a non-volatile data storage medium (e.g., a hard disk drive or a removable storage component installed in a drive) and then loaded into a volatile data storage medium (e.g., RAM) when operated on by the processor 126. Other examples are possible as well.

In one aspect, data storage 128 may contain a topological map data application 130 that enables the server 120 to generate and store data representing a topological map. During execution of the topological map data application 130, the server 120 may perform various tasks related to generating the topological map data, including those described above with reference to step 84. After generating the topological map data, the server 120 may store the data into a topological map database 140. The data in the topological map database 140 may take various forms, including those described above with reference to step 84.

In another aspect, data storage 128 may contain an association data application 132 that enables the server 120 to generate and store data associating one or more map-to-scale points and/or links with one or more corresponding topological map points and/or links. During execution of the association data application 132, the server 120 may perform various tasks related to generating the association data, including those described above with reference to steps 88 and 108. The stored association data may then take various forms, including those described above with reference to steps 88 and 108.

VI. Conclusion

A method and system of providing navigation-related functions and features for a topological map is described herein. It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method of providing location-based information comprising:

providing a map-to-scale database which may be used to generate a map-to-scale depiction of a geographic region and a plurality of physical features therein with geographic accuracy and scaling, and may be further used to calculate routes and generate route guidance between two or more locations within the geographic region, the map-to-scale database further including location-related information, the location-related information being associated with a first set of locations within the geographic region, the location-related information comprising data related to the plurality of physical features located at or near each location of the first set of locations, the location-related information further comprising depicted location-related information that would be depicted within the map-to-scale depiction and non-depicted location-related information that would not be depicted within the map-to-scale depiction, wherein the non-depicted location related information comprises information which may be used calculate a route between locations of the first set of locations and provide route guidance there between;

providing a topological map not derived from the provided map-to-scale database, the topological map depicting a second set of locations, a subset of which are also included in the first set of locations for which the map-to-scale database includes location-related information associated therewith;

receiving into a computing device a query for the location-related information from the map-to-scale database for a particular route between an origin location and a destination location within the subset of the second set of locations depicted by the topological map;

determining, based on the particular route specified by the received query, the locations in the first set of locations corresponding to the origin location and destination location;

accessing, by the computing device, the location-related information in the provided map-to-scale database associated with the determined locations, the accessed location-related information including both depicted and non-depicted location-related information, and calculating a route from the origin location to the destination location based thereon; and displaying, by the computing device, the calculated route with respect to the origin and destination locations specified by the received query in the provided topological map.

2. The method of claim 1, wherein the origin and destination locations specified by the received query comprises one or more of a current location of the computing device, a destination input by a user, a location of a point of interest, and an origin and a destination of a specified route therebetween.

3. The method of claim 1 wherein the query is automatically generated.

4. The method of claim 1, wherein the calculating further comprises generated route guidance corresponding to the calculated route, the displaying further comprising providing the route guidance in the provided topological map.

5. The method of claim 1, wherein the determining further comprises:
identifying the locations in the first set of locations having the same names as the origin and destination location specified by the received query.

6. The method of claim 1, wherein the determining further comprises:
identifying the locations in the first set of locations which have the same relationship to other locations as the origin and destination locations specified by the received query.

7. The method of claim 1, wherein displaying the calculated route with respect to the origin and destination locations specified by the received query in the provided topological map comprises displaying the calculated route in an augmented reality view.

8. The method of claim 1, wherein displaying the calculated route in the provided topological map comprises displaying an updated topological map that includes the calculated route.

9. The method of claim 1, wherein the provided map-to-scale database is provided by a map developer and the provided topological map is provided by a third party.

10. The method of claim 1, wherein the provided map-to-scale database and the provided topological map are both provided by a map developer.

11. The method of claim 1 wherein the providing of the topological map further comprises providing, by an image capture device, the topological map.

12. A method of providing location-based information comprising:
providing a map-to-scale database which may be used to generate a map-to-scale depiction of a geographic region and a plurality of physical features therein with geographic accuracy and scaling, and may be further used to calculate routes and generate route guidance between two or more locations within the geographic region, the map-to-scale database further including location-related information, the location-related information being associated with a first set of locations within the geographic region, the location-related information comprising data related to the plurality of physical features located at or near each location of the first set of locations, the location-related information further comprising depicted location-related information that would be depicted within the map-to-scale depiction and non-depicted location-related information that would not be depicted within the map-to-scale depiction, wherein the non-depicted location related information comprises information which may be used calculate a route between locations of the first set of locations and provide route guidance there between;

providing a topological map not derived from the provided map-to-scale database, the topological map depicting a second set of locations, a subset of which are also included in the first set of locations for which the map-to-scale database includes location-related information associated therewith;

receiving into a computing device a query for the location-related information from the map-to-scale database for a particular link having locations within the subset of the second set of locations depicted by the topological map;

determining, based on the locations of the particular link specified by the received query, the locations in the first set of locations corresponding thereto;

accessing, by the computing device, the location-related information in the provided map-to-scale database associated with the determined location, the accessed location-related information including both depicted and non-depicted location-related information, and calculating a route between the locations of the particular link based thereon; and displaying, by the computing device, the calculated route with respect to the particular link of the received query in the provided topological map.

13. The method of claim 12, wherein at least one of the locations of the particular link comprises one or more of current location of the computing device, a destination input by a user, a location of a point of interest, and an origin and a destination of a specified route therebetween.

14. The method of claim 12 wherein the query is automatically generated.

15. The method of claim 12, wherein the calculating further comprises generated route guidance corresponding to the calculated route, the displaying further comprising providing the route guidance in the provided topological map.

16. The method of claim 12, wherein the determining further comprises:
identifying the location in the first set of locations having the same name as the particular link specified by the received query.

17. The method of claim 12, wherein the determining further comprises:
   identifying the location in the first set of locations which has the same relationship to another location as the particular link specified by the received query.

18. The method of claim 17, wherein the relationship is represented in terms of one or both of distance or time.

19. The method of claim 17, wherein displaying the calculated route with respect to the corresponding one or more links in the provided topological map comprises displaying the calculated route at a relative position on a link in the provided topological map that is based on a determined relative position of the location-related information on a corresponding link in the provided map-to-scale database.

20. The method of claim 12, wherein displaying the calculated route with respect to the one or more links in the provided topological map comprises displaying the calculated route in an augmented reality view.

21. The method of claim 12, wherein displaying the calculated route with respect to the one or more links in the provided topological map comprises displaying an updated topological map that includes the calculated route.

22. The method of claim 12 wherein the providing of the topological map further comprises providing, by an image capture device, the topological map.

23. A non-transitory computer readable medium having data stored thereon, the data comprising:
   map-to-scale data, stored in a database, which may be used to generate a map-to-scale depiction of a geographic region and a plurality of physical features therein with geographic accuracy and scaling, and may be further used to calculate routes and generate route guidance between two or more locations within the geographic region, the map-to-scale data further including location-related information, the location-related information being associated with a first set of locations within the geographic region, the location-related information comprising data related to the plurality of physical features located at or near each location of the first set of locations, the location-related information further comprising depicted location-related information that would be depicted within the map-to-scale depiction and non-depicted location-related information that would not be depicted within the map-to-scale depiction, wherein the non-depicted location related information comprises information which may be used calculate a route between locations of the first set of locations and provide route guidance there between;
   topological data representing a topological map not derived from the map-to-scale data, the topological map depicting a second set of locations, a subset of which are also included in the first set of locations for which the map-to-scale data includes location-related information associated therewith; and
   association data representative of the subset of the second set of locations depicted by the topological map wherein for a selected origin location and destination location of the subset of the second set of locations depicted by the topological map, both depicted and non-depicted location-related information from the map-to-scale data for the location in the first set of locations corresponding to the selected location is determined based on the association data and used to calculate a route between the origin and destination locations for display in the topological map with respect to the selected location.

24. The non-transitory computer readable medium of claim 23 wherein the topological map data further comprises an image of a topological map obtained from an image capture device.

* * * * *